US006557601B1

(12) United States Patent
Taylor

(10) Patent No.: US 6,557,601 B1
(45) Date of Patent: May 6, 2003

(54) MECHANICAL STOP SYSTEM

(75) Inventor: Christopher L. Taylor, Dallas, TX (US)

(73) Assignee: Taylor Design Group, Carrollton, TX (US)

( * ) Notice: Subject to any disclaimer, the term of this patent is extended or adjusted under 35 U.S.C. 154(b) by 0 days.

(21) Appl. No.: 09/921,463

(22) Filed: Aug. 3, 2001

(51) Int. Cl.[7] .......................... B27B 31/60; B26D 7/00; B23Q 3/00

(52) U.S. Cl. ........................ 144/253.1; 33/497; 33/832; 33/430; 33/471; 83/435.14; 83/468.7; 83/468.3; 83/468; 83/467.1; 269/303; 269/315

(58) Field of Search .......................... 33/497, 628, 630, 33/638, 639, 640, 641, 642, 832, 430, 471; 83/431, 435, 435.11, 435.14, 435.15, 435.16, 477.2, 714, 715; 144/251.1, 251.2, 253.5; 269/303, 315, 60, 56

(56) References Cited

U.S. PATENT DOCUMENTS

| | | | | |
|---|---|---|---|---|
| 4,793,604 A | | 12/1988 | Taylor | |
| 5,038,486 A | | 8/1991 | Ducate, Sr. | |
| 5,239,763 A | | 8/1993 | Kulp | |
| 5,337,641 A | | 8/1994 | Duginski | |
| 5,617,909 A | | 4/1997 | Duginski | |
| 5,716,045 A | * | 2/1998 | Taylor | 269/60 |
| 5,768,966 A | | 6/1998 | Duginski | |
| 5,845,555 A | * | 12/1998 | Dawley | 83/467.1 |
| 6,061,921 A | * | 5/2000 | Adams et al. | 144/253.1 |

OTHER PUBLICATIONS

Woodworking FasT Trak Inc. 67K09.01 Flip Stop, Rev. Dec. 1998.

Woodworking FasT Trak. Inc. 67K10.03 Microadjuster, Rev. Jan. 1999.

Taylor Design Group, Inc., Owner's Manual for Incra PRO Fence System, Feb. 1994.

Taylor Design Group, Inc., Owner's Manual for Incra Track Get on the Track, Jan. 1999.

Taylor Design Group, Inc., Owner's Manual for Incra Shop Stop, The Versatile Stop Positioner, Jan. 1999.

Taylor Design Group, Inc., Miter Gauges by Incra, 2000.

Taylor Design Group, Inc., Flip Shop Stop Instructions, Sep. 2000.

Taylor Design Group, Inc., Owner's Manual for Miter 3000, Oct. 2000.

Osborne Manufacturing Company, Instruction Manual for Osborne Miter Guide, date unknown.

* cited by examiner

*Primary Examiner*—W. Donald Bray
(74) *Attorney, Agent, or Firm*—Thompson & Knight, LLP; Richard Wynne; Robert C. Hilton

(57) ABSTRACT

An expandable mechanical stop is provided for positioning a workpiece during woodworking or other operations. The mechanical stop includes a positioning body which is adjustably attached to a track, the track having a vertical face that abuts an edge of the workpiece during operation. A stop arm is connected to the positioning body and includes a rear face that is substantially adjacent to the vertical face of the track. Anti-biasing means are provided to prevent the workpiece from dislodging the stop arm by sliding between the stop arm and the track. In one configuration, tabs are provided on the rear face and are received by grooves on the vertical face to serve as the anti-biasing means. In another configuration, grooves are provided on the rear face and receive tabs disposed on the vertical face.

24 Claims, 16 Drawing Sheets

MECHANICAL STOP SYSTEM

BACKGROUND OF THE INVENTION

1. Field of the Invention

This invention relates generally to woodworking equipment, and in particular to an apparatus for precisely orienting and maintaining a workpiece in a predetermined position relative to a cutting tool.

2. Description of Related Art

Operations associated with the cutting, drilling, and shaping of wood or other materials with power tools require the workpiece to be positioned accurately relative to the tool in order to achieve the desired results. In certain applications, the positioning of the workpiece is accomplished through the use of a "fence" which is positioned relative to the tool. In some applications, a table saw, for example, the fence may be aligned along the cutting axis of the tool to achieve a substantially straight cut as the workpiece is guided through the saw blade when one edge of the workpiece is maintained in abutting relationship with the fence. In other applications, a miter saw or drill press, for example, the fence may be used, by maintaining one edge of the workpiece in abutting relationship with the fence, to assist in holding the workpiece in a fixed position while the tool passes through the workpiece.

Another positioning device used in connection with a fence is a mechanical stop. Typically, the stop is slidably or removably mounted on the fence with a portion extending down the face of the fence to a point at or near the base of the fence. While the fence is used to position the workpiece in one dimension relative to the tool, the stop allows the workpiece to also be positioned relative to the tool in a dimension along the axis of the fence. When used with a miter head on a table saw, for example, the stop permits positioning of the workpiece such that the workpiece may be cut to a particular length. When used with a router table and fence, for example, the stop may be positioned to stop the workpiece at a predefined position such that the router cut is made only a predefined amount along the axial dimension of the workpiece.

One shortcoming of existing mechanical positioning devices is that they have typically not been capable of providing the accuracy required for many applications. The positioning devices are often large and made of heavy steel to increase accuracy by reducing the amount of mechanical flex in the positioning devices themselves. Their size and weight make these devices cumbersome and difficult to use. Further, despite their size and weight, these devices are still not sufficiently accurate for precision applications.

A shortcoming associated with mechanical stops is that they are typically designed to interface with a particular fence and cannot be used with fences for other tools, or if the fence configuration is modified. For example, in many woodworking operations, it is desirable to connect an auxiliary fence to the face of the existing fence. Most mechanical stops cannot be used together with an auxiliary fence. Some fence manufacturers have attempted to overcome that shortcoming by configuring the fence to permit positioning of the mechanical stop in different locations perpendicular to the face of the fence depending on whether an auxiliary fence is installed. These stop/fence combinations still have the inherent shortfall that the mechanical stop is designed only to interface with a particular fence.

A number of positioning jigs have recently been designed in order to improve the positioning process. For instance, U.S. Pat. No. 4,793,604 granted to Christopher L. Taylor (hereinafter referred to as "the Taylor '604 patent") discloses a universal precision positioning jig adapted for precision positioning of a workpiece with respect to a woodworking tool, such as a table saw, router table, drill press, or other tool. The Taylor '604 patent includes a fixed lower body member and a moveable upper body member, each having mounted thereon a series of tooth-like projections formed into elongated racks. The upper body member is provided with a mount for a fence and is moveable with respect to the fixed lower body member. The racks are meshed together by the tightening of a knob threaded through the middle of the upper and lower body members. The knob is tightened after the fence has been properly positioned to prohibit movement of the upper and lower body members relative to each other during the cutting operation. This, in turn, fixes the position of the fence.

The toothed rack meshing system was further improved upon in U.S. Pat. No. 5,195,730 (hereinafter referred to as "the Taylor '730 patent"), also granted to Christopher L. Taylor. The Taylor '730 patent discloses a fixed based and a carriage, the carriage being moveable with respect to the base. Toothed racks such as those taught in the Taylor '604 patent are also used. One toothed rack is mounted on the carriage and a complementary toothed rack is mounted on the base. The carriage rides in slots on the base and is spring loaded to prevent meshing of the toothed racks until positioning is completed. A cammed clamping lever attached to a rod running through the carriage and base clamps the carriage and the base together, thereby locking and intermeshing the toothed racks to set the carriage position.

One improvement in the art resulting from the Taylor '604 and '730 patents is the use of calibrated templates slidably mounted in slots on the carriage. A cursor above the. templates measures the position of the carriage with respect to the cutting blade. Formulas are printed on the templates in order to produce complicated cuts such as dovetail joints or box joints. Using these templates, woodworkers can quickly create intricate wood products previously attainable only by experienced professionals.

The intermeshing teeth on the toothed racks of the Taylor '604 and '730 patents are set at intervals of 1/32 of an inch, and provide fully repeatable positioning with a precision of 1/32 of an inch. The accuracy and rapidity of positioning with the Taylor designs constitutes a substantial improvement in the art. U.S. Pat. No. 5,716,045, which also issued to Christopher L. Taylor (the "Taylor '045 patent"), further improved upon the previous Taylor patents by combining a micropositioning feature with the toothed racks.

Some mechanical stops include pivotal features that allow a portion of the mechanical stop providing support for the workpiece to pivot between a work position and a standby position. In the work position, the stop is configured to engage and position the workpiece along the fence relative to the cutting tool. The stop can be rotated into the standby position such that it no longer engages the workpiece.

U.S. Pat. No. 5,337,641 issued to Duginske discloses a stop and fence combination for woodworking applications. The stop is slidably positionable along the length of the fence using a bolt/nut combination with the nuts located within a T-slot along the top of the fence. The stop is configured such that it may be rotated up and away from the fence so that the fence may be used without the stop while the stop remains connected to the fence.

U.S. Pat. No. 5,768,966, which also issued to Duginske, discloses a fence geometry that permits the rotatable stop from the '641 patent to be used when an auxiliary fence is attached to the face of the main fence. The '966 patent accommodates the auxiliary fence by adding a second T-slot adjacent to and parallel to the T-slot of the '641 patent. When the stop is used without an auxiliary fence, the stop is connected to the fence using the T-slot further from the fence face. When the stop is used with an auxiliary fence, the stop is connected to the fence using the T-slot nearer the fence face.

One shortcoming associated with rotatable stops is the mechanical flex associated with pivotable parts. This flex, under some circumstances, can reduce the positioning accuracy of the stop. Another shortcoming is evident when using a pivotable stop in conjunction with a mitered workpiece. A mitered workpiece having a “sharp” corner can act as a wedge and actually slide between the pivotable stop and the fence, causing the stop to rotate upward toward the standby position. This rotation of the pivotable stop decreases and in some cases eliminates the ability of the stop to hold the workpiece.

Traditional stops (i.e. non-rotatable stops) can also experience inaccuracy problems when positioning mitered workpieces. A sharp corner of the workpiece can wedge itself between the stop and the fence. This can produce several undesirable effects, including improper cuts to the workpiece, damage to the mitered comer of the workpiece, and potential danger to the woodworker.

Accordingly, there remains a need in the woodworking industry for an improved positioning jig having the properties of precision, repeatability, and interchangeability that are required by modem-day woodworkers. It would therefore be beneficial to the woodworking industry to provide a mechanical stop system embodying an efficient and accurate design having a rotatable mechanical stop. Moreover, it would be beneficial to provide a mechanical stop system that could be used with either a single fence or an auxiliary fence installed on a basic fence. It would also be a great improvement in the art if the mechanical stop itself could be made to interface with the positioning fences used for different tools so that when a mechanical stop is required for different applications, the stop alone, as opposed to the stop and fence combination, may be installed for use with a particular tool. Further, it is desirable to provide a mechanical stop that prevents movement of the workpiece between the stop and the fence.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The present invention seeks to resolve the above and other problems with the prior art. More particularly, the invention advances the art by providing an expandable mechanical stop system achieving the objects listed below.

It is an object of the present invention to provide a mechanical stop that is configured to be used in combination with a workpiece positioning fence on a variety of tools.

It is further an object of the present invention to provide such a mechanical stop that is expandable so that it can be used in combination with a workpiece positioning fence both when an auxiliary fence is installed and when no such auxiliary fence is installed, or with work piece positioning fences of differing thicknesses.

It is further an object of the present invention to provide a mechanical stop system having a track that is used as a fence when attached to a woodworking or other tool.

It is further an object of the present invention to provide a mechanical stop system that is capable of accurate, finite incremental positioning.

It is further an object of the present invention to provide a mechanical stop system that incorporates a micro-positioning capability to provide even greater accuracy and resolution in positioning.

It is further an object of the present invention to provide a mechanical stop system that prevents the workpiece from translating laterally along the fence (or track) such that a portion of the workpiece would move between the stop and the fence.

To achieve the foregoing objects, and in accordance with the invention as embodied and described herein, the present invention includes a mechanical stop that is configured for attachment to a track. The track includes a vertical face for abutting a workpiece during woodworking and other operations. The mechanical stop includes a positioning body that is configured to be releasably attached to the track. A stop arm is pivotally connected to the positioning body and provides further support and positioning capability for the workpiece when the stop arm is in a work position. When the stop arm is rotated into a standby position, the stop arm can no longer engage the workpiece. The stop arm includes a rear face that is substantially adjacent to the vertical face of the track when the stop arm is disposed in the work position. Finally, the mechanical stop includes anti-biasing means which prevent the workpiece from dislodging the stop arm from the work position during operation.

In another embodiment of the present invention, a woodworking machinery jig and fixture system is provided that includes an L-shaped track having a base adjustably mounted to the track. The track includes a first leg and a second leg, the first leg having a front side and the second leg having a top side. The top side of the second leg includes a guide in which the base is adjustably mounted. A flip stop is pivotally mounted to the base and is capable of rotation between a work position and a standby position. The flip stop includes a rear face that is substantially adjacent to the front side of the first leg when the flip stop is in the work position. Anti-biasing means are provided to prevent a workpiece from dislodging the flip stop from the work position during operation.

In still another embodiment of the present invention, a mechanical stop is provide for positioning a workpiece during woodworking or other operations. The mechanical stop works in conjunction with a track having a vertical face that abuts the workpiece. The mechanical stop includes a positioning that is configured to be releasably attached to the track. The positioning body can be incrementally adjusted along a longitudinal axis of the track using incremental adjustment means. A stop arm is connected to the positioning body and provides additional support and positioning capability for the workpiece. The stop arm includes a rear face that is substantially adjacent to the vertical face of the track when the positioning body is installed on the track. Anti-biasing means are provided to prevent the workpiece from dislodging the stop arm such that the workpieced could slide between the rear face and the vertical face.

Other objects, features, and advantages of the present invention will become apparent with reference to the drawings and detailed description which follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
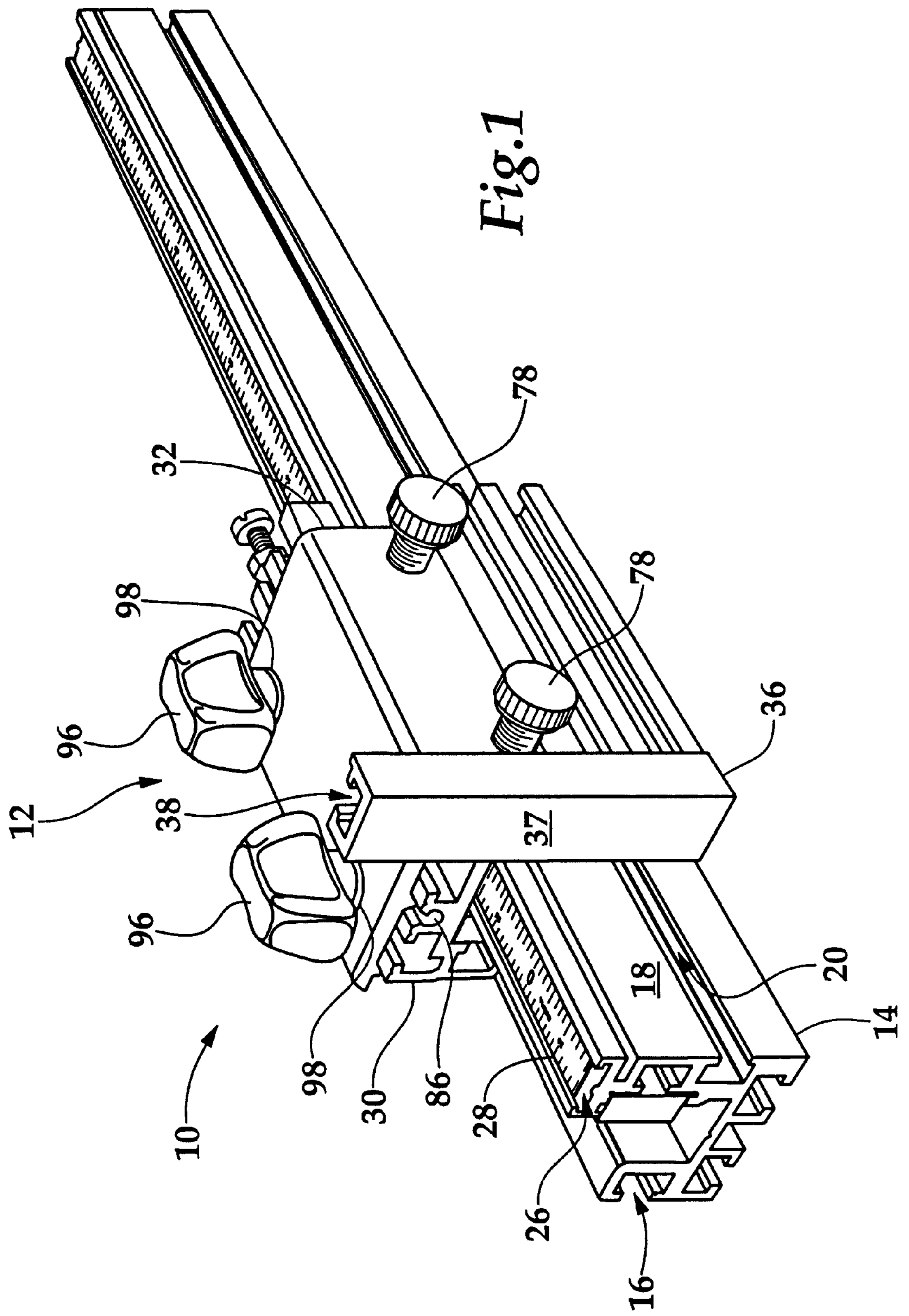
FIG. 1 illustrates a perspective view of an expandable mechanical stop system having a mechanical stop and a track according to the present invention.

Referring to FIG. 1 in the drawings, the present invention comprises an expandable mechanical stop system 10 to provide precision workpiece positioning in woodworking and other operations. Stop system 10 includes an expandable mechanical stop 12 which rests in slidable engagement thereon a track 14, which is preferably an extrusion of aluminum, although other materials may be used. Track 14 is configured to be mounted to existing woodworking tools or woodworking supports, either as a substitute to a typical fence or connected to a typical fence. Those skilled in the art will appreciate that track 14 could be mounted to the existing tools by any standard techniques, but in the preferred embodiment, track 14 includes a first T-slot 16 which is used for mounting the track as described in more detail below.

Figure 14:
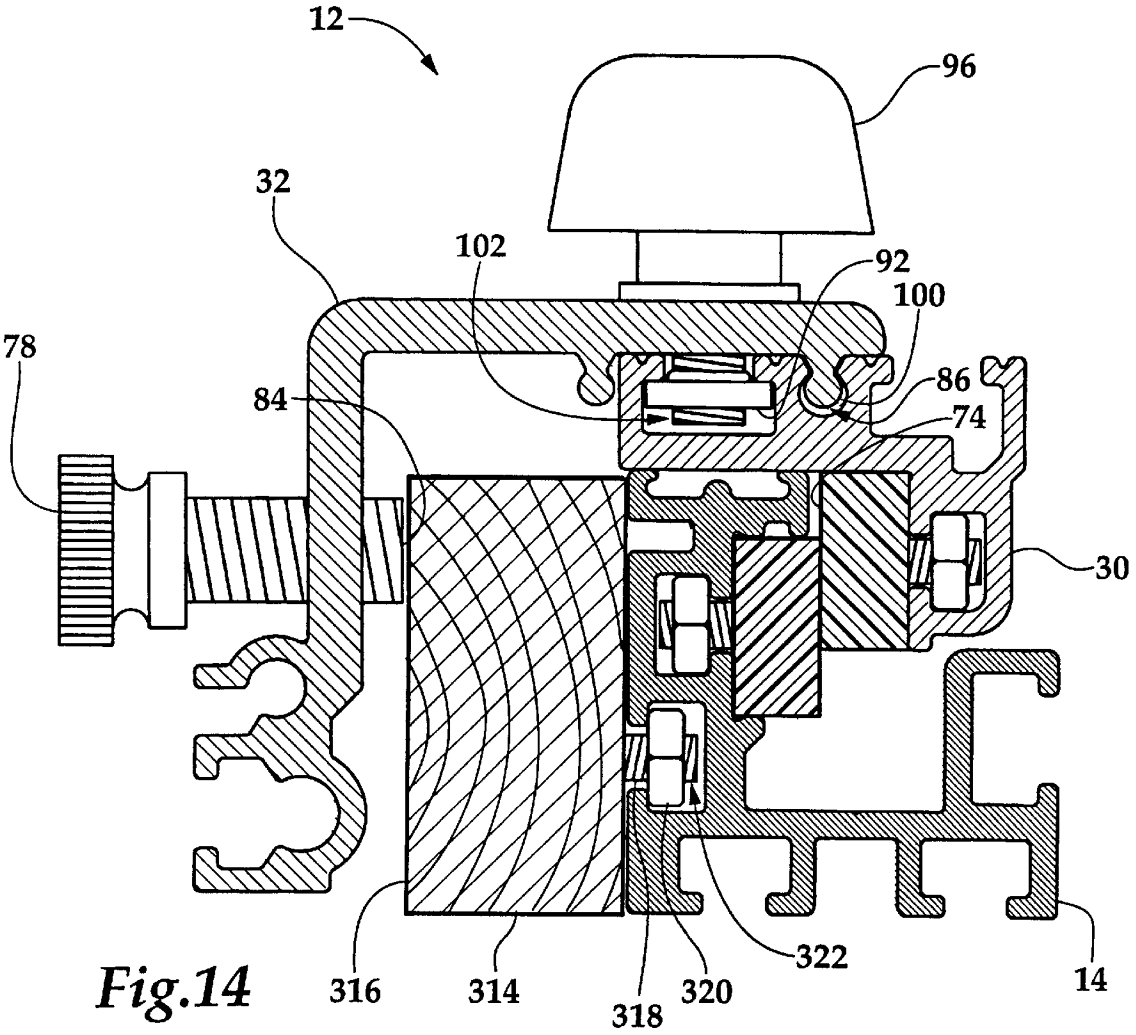
FIG. 14 illustrates an end view of the mechanical stop of FIG. 1 configured in an expanded position to facilitate operation with an auxiliary fence.

Track 14 includes a substantially vertical face 18, however, face 18 could be somewhat angled to accommodate for different types of workpieces. During woodworking or other operations, one edge of a workpiece is maintained in abutting relationship with vertical face 18. Preferably, track 14 includes a second T-slot 20 disposed on an opposite side of track 14 from first T-slot 16. Second T-slot 20 is used to attach an auxiliary fence 314 (as shown in FIG. 14) to track 14 such that auxiliary fence 314 abuts vertical face 18. Track 14 preferably includes a third T-slot and a fourth T-slot, both of which are located on a bottom side of the track 14. Those of ordinary skill in the art will appreciate that both the third and fourth T-slots can be used to attach track 14 to an existing tool, the track 14 substituting for a typical fence having attachment points on a lower surface of the fence.

A top portion of track 14 preferably includes a channel 26. A template 28, which is preferably a scale, may be disposed within channel 26 for use in positioning the workpiece relative to the woodworking or other tool by providing marks at predetermined intervals along template 28. Mechanical stop 12 may be positioned relative to track 14 by reference to a selected mark on template 28.

Preferably, mechanical stop 12 includes a track engagement member 30 which engages track 14 to prevent longitudinal movement of mechanical stop 12 along track 14. Mechanical stop 12 also includes a positioning body 32 having means for releasably attaching positioning body 32 to track 14. A substantially vertical stop arm 36 having a workpiece engagement face 37 and a stop arm T-slot 38 is slidably attached to positioning body 32 to position the workpiece during woodworking or other operations. Stop arm 36 also includes a rear face 39 see (FIG. 6; analogous to rear face 639 of FIGS. 18 and 19 and rear surface 739 of FIG. 20 and 21) that is configured to be substantially adjacent to vertical face 18 of track 14 when mechanical stop 12 is secured to track 14. In one configuration, rear face 39 actually mates with vertical face 18. In other configurations, the faces 18, 39 are spaced apart, sometimes being parallel to each other, sometimes not being parallel.

It is important to note that mechanical stop 12, while shown in FIG. 1 as having both and track engagement member 30 and a positioning body 32, could comprise only a positioning body 32 attached directly to track 14 without the need for track engagement member 30. Such a configuration is discussed in more detail below, especially with reference to FIGS. 19–21.

Figure 2:
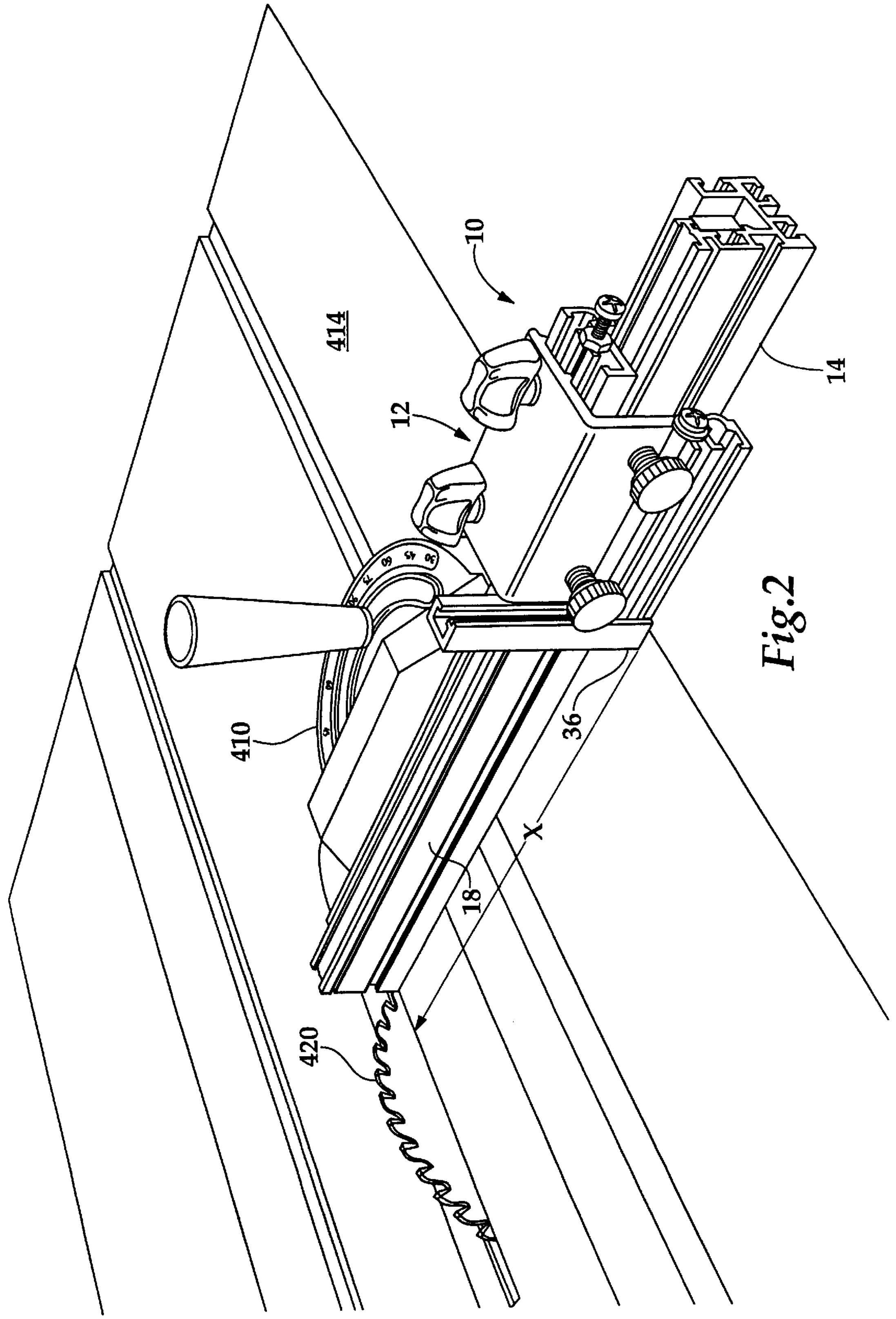
FIG. 2 depicts a perspective view of the mechanical stop of FIG. 1 in a non-expanded configuration installed on a table saw.

Referring to FIG. 2 in the drawings, a typical installation of expandable mechanical stop system 10 is illustrated, the mechanical stop system being disposed on a miter head 410 which is slidably disposed on table saw work surface 414. In operation, mechanical stop 12 is positioned along a longitudinal axis of track 14 at a desired position X relative to a saw blade 420. When mechanical stop 12 is so positioned, it is engaged, as described in detail below, to track 14 to prevent longitudinal movement along track 14, thereby providing a precise and repeatable positioning system for a workpiece (not illustrated) disposed on work surface 414 and having adjacent edges placed in abutting relationship with vertical face 18 and vertical stop arm 36.

Figure 3:
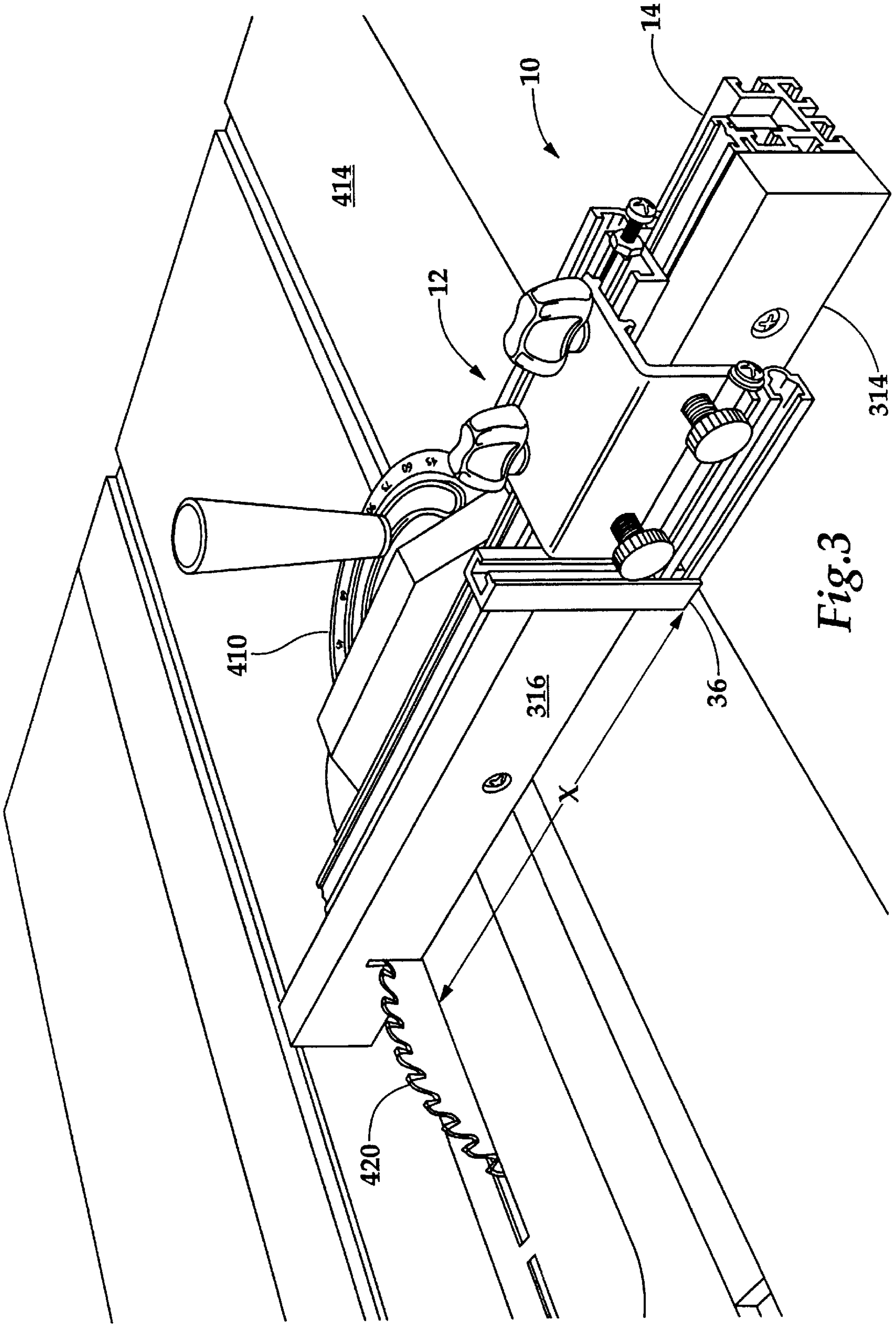
FIG. 3 illustrates a perspective view of the mechanical stop of FIG. 1 in an expanded configuration installed on a table saw.

Referring to FIG. 3 in the drawings, another typical installation of expandable mechanical stop system 10 is illustrated. In FIG. 3, however, mechanical stop 12 is depicted in an expanded configuration, as described in more detail below, so that it may be used when auxiliary fence 314 is attached to track 14. Similar to the non-expanded configuration depicted in FIG. 2, when mechanical stop 12 is in the expanded configuration and positioned at the desired position X relative to saw blade 420, mechanical stop 12 is engaged to track 14, thereby providing a precise and repeatable positioning system for the workpiece, the workpiece being disposed on work surface 414 and having adjacent edges placed in abutting relationship with an auxiliary fence face 316 and vertical stop arm 36. Those skilled in the art will appreciate that the table saw installations of the expandable mechanical stop system 10 in FIGS. 2 and 3 are merely by way of example, and not by limitation, in that mechanical stop system 10 may be installed on any power tool configured for installation of a fence.

Figure 4:
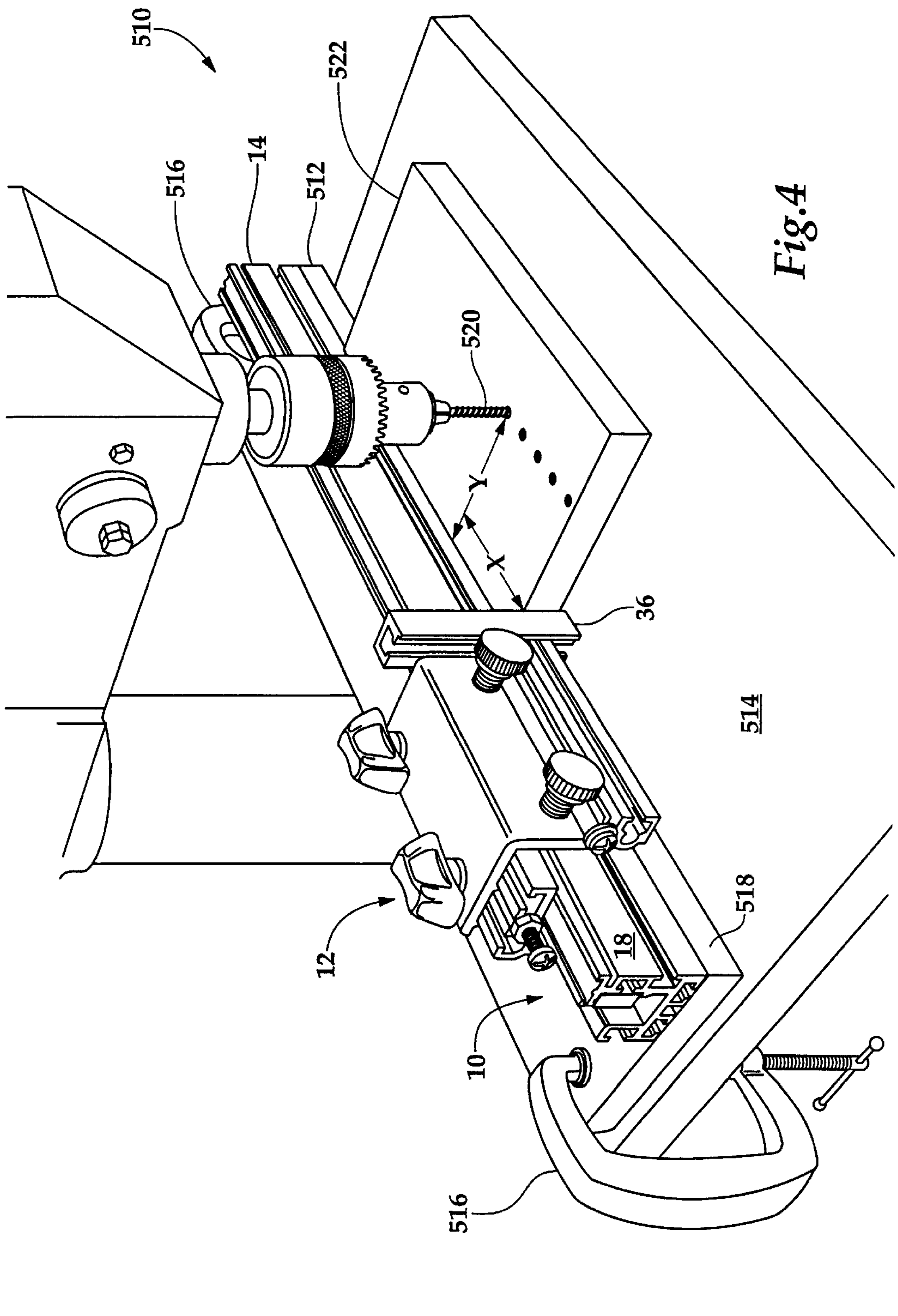
FIG. 4 depicts a perspective view of the mechanical stop of FIG. 1 in the non-expanded configuration installed on a drill press.

Referring to FIG. 4 in the drawings, expandable mechanical stop system 10 is installed on a drill press 510. While those skilled in the art will appreciate that mechanical stop system 10 could be installed on drill press 510 in a variety of configurations, FIG. 4 illustrates track 14 attached to a mounting member 512, which is attached to a work surface 514 using a plurality of clamps 516. In operation, a face 518 of mounting member 512 is substantially coplanar with vertical face 18, and both faces 18, 518 are located at a desired position Y relative to a drill bit 520. Further, mechanical stop 12 is positioned along the longitudinal axis of track 14 at the desired position X relative to drill bit 520. A workpiece 522 is positioned in abutting relationship with face 518, vertical face 18, and vertical stop arm 36. When installed on drill press 510, expandable mechanical stop system 10 prevents movement of workpiece 522 relative to drill bit 520, thereby providing a precise and repeatable positioning system.

Figure 5A:
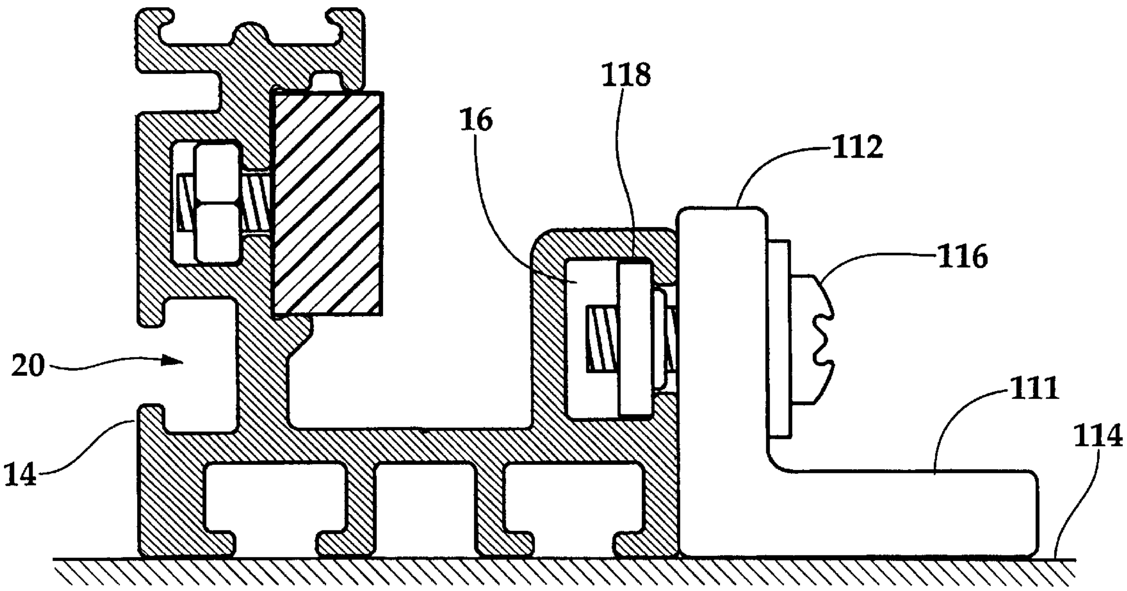
FIG. 5A illustrates an end view of the track of FIG. 1 mounted to a woodworking or other tool.

Referring to FIG. 5A in the drawings, a preferred configuration is illustrated for attaching track 14 to a woodworking tool or other tool, generically designated as tool 111. Tool 111 can comprise any geometric configuration but will typically include a portion 112 which is substantially perpendicular to a work surface 114. At least one bolt 116 passes through portion 112 and is screwed into a corresponding nut 118, which is capture in T-slot 16. By tightening bolt 116, tool 111 is securely fastened to track 14. While one bolt 116 and one nut 118 are sufficient to secure track 14 to the tool 111, it will be readily understood that a more rigid connection will be achieved if track 14 is mounted to tool 111 using at least two bolts 116 and two corresponding nuts 118 spaced longitudinally apart within the T-slot 16 of track 14.

Figure 5B:
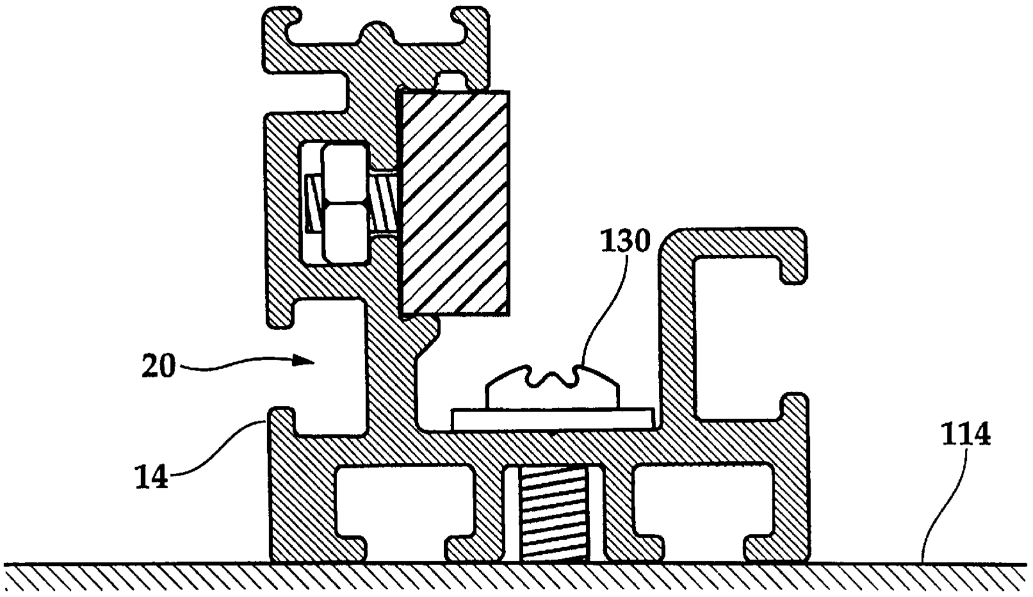
FIG. 5B depicts an end view of the track of FIG. 1 mounted to a horizontal surface associated with a woodworking or other tool.

Referring to FIG. 5B in the drawings, an alternative method of installing track 14 on a woodworking tool is illustrated. In this configuration, two or more screws 130 are inserted through a lower portion of track 14 and are threaded directly into work surface 114. By tightening screws 130, movement of track 14 relative to surface 114 is substantially inhibited.

Those skilled in the art will appreciate that the configurations described above and in FIGS. 5A and 5B for mounting track 14 to tool 111 using first T-slot 16 will similarly apply to the attachment of items such as an auxiliary fence to track 14 using second T-slot 20 (see FIG. 14).

Figure 6:
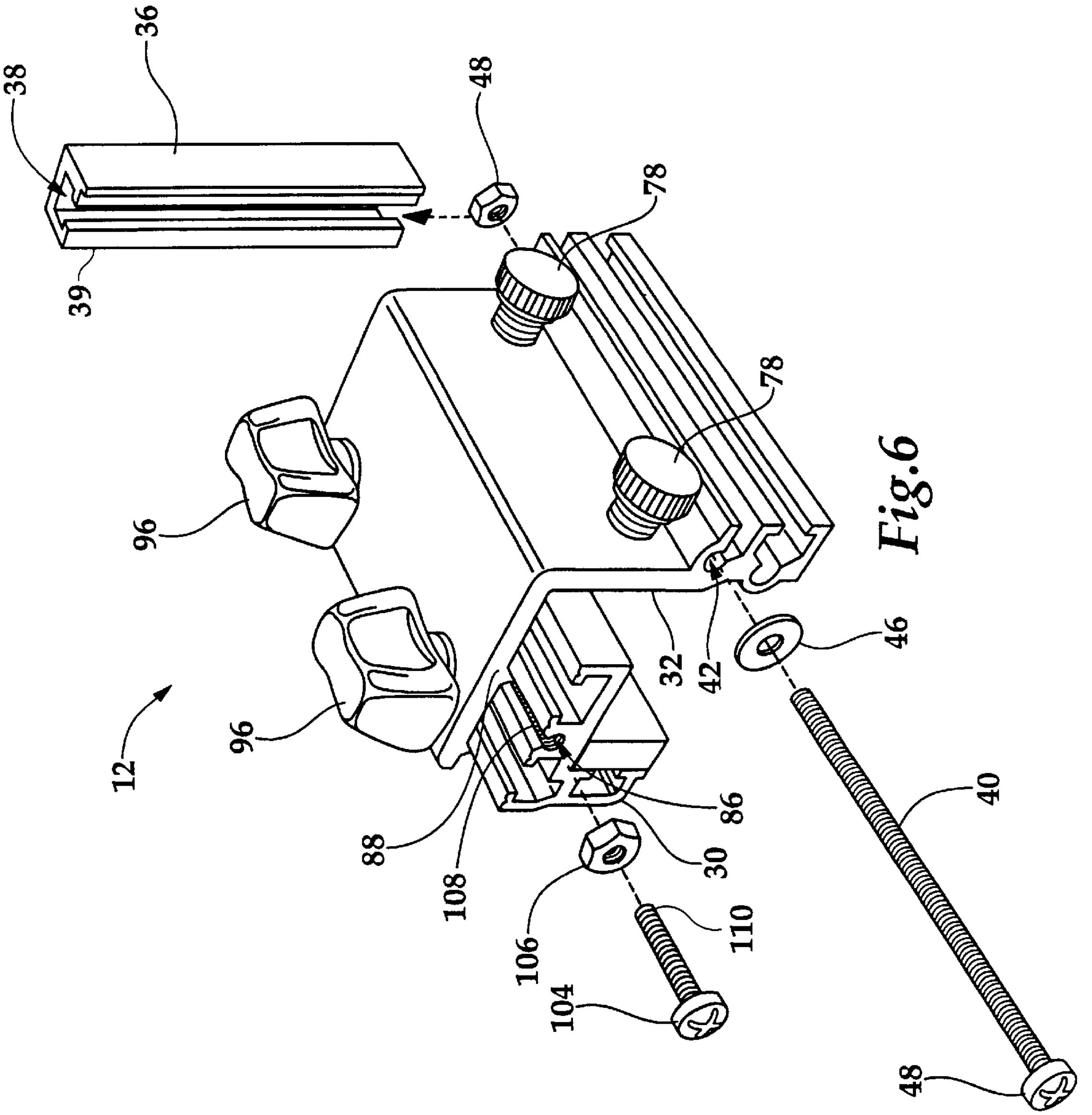
FIG. 6 illustrates a partially-exploded perspective view of the mechanical stop of FIG. 1.
Figure 7:
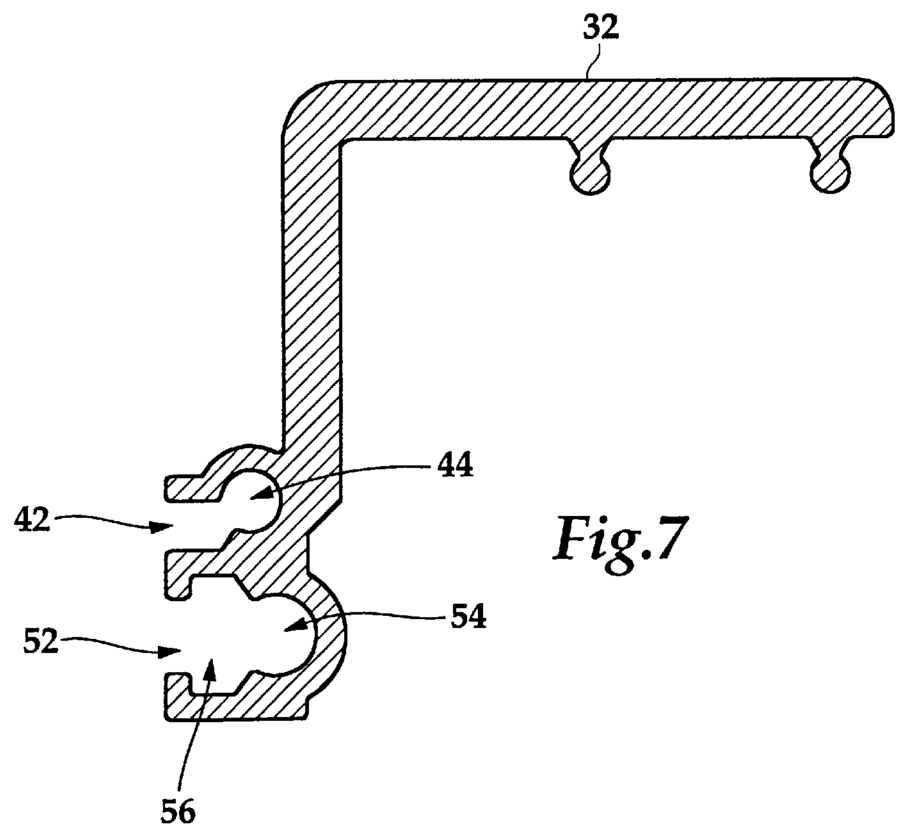
FIG. 7 depicts an end view of a positioning body, which forms a part of the mechanical stop of FIG. 1.

Referring to FIG. 6 in the drawings, a partially exploded view of mechanical stop 12 demonstrates one configuration for attaching stop arm 36 to positioning body 32. A machine screw 40 is passed through a first keyhole slot 42 formed in positioning body 32. Machine screw 40 may also be passed through a washer 46 to separate screw head 48 of machine screw 40 from positioning body 32. A preferred cross section of first keyhole slot 42 is shown in FIG. 7 depicting an end view of positioning body 32. First keyhole slot 42 has a bore 44 of partially circular cross section to retain machine screw 40. Referring again to the partially exploded view in FIG. 6, machine screw 40 is threaded into a nut 48 which is inserted within stop arm T-slot 38 such that tightening of machine screw 40 securely attaches stop arm 36 to positioning body 32. Stop arm 36 is vertically slidable relative to positioning body 32 when machine screw 40 is partially loosened relative to nut 48.

Figure 8:
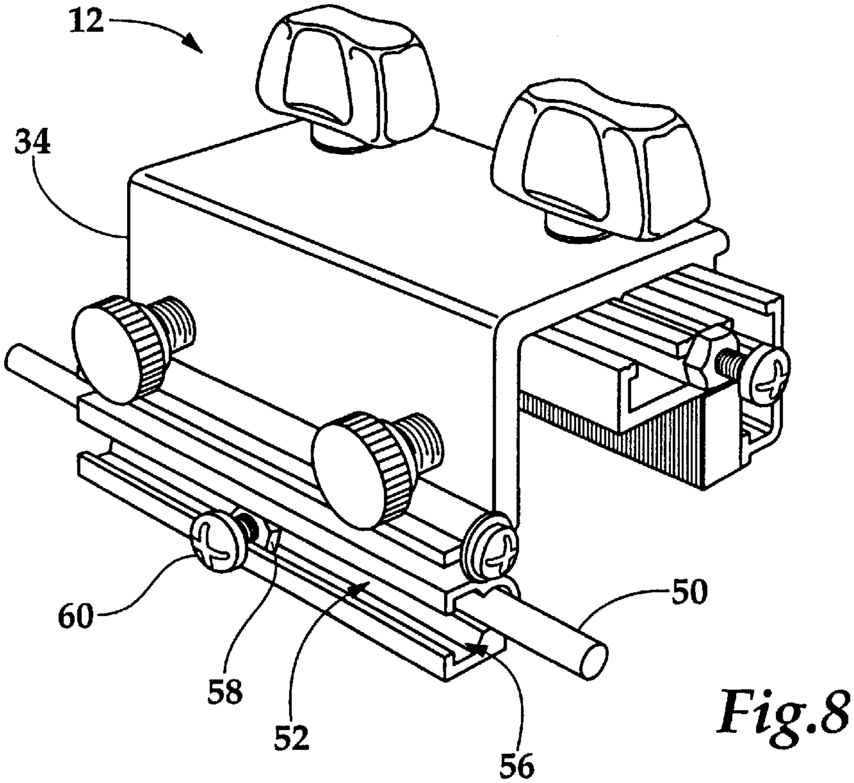
FIG. 8 illustrates a perspective view of the mechanical stop of FIG. 1 having a horizontal stop rod installed.

Referring to FIG. 8 in the drawings, the installation of a horizontal stop rod 50 on mechanical stop 12 is illustrated. Stop rod 50 is slidably retained within a second keyhole slot 52 forming part of positioning body 32. FIG. 7 shows the preferred cross-section of second keyhole slot 52 formed on positioning body 32. Second keyhole slot 52 includes a rod retention channel 54 configured to slidably retain stop rod 50 therein and a nut engagement channel 56. Referring again to FIG. 8, a nut 58 is slidably disposed within nut engagement channel 56, which has a vertical dimension sufficiently large to receive nut 58 but sufficiently small to restrict nut 58 from rotation therein. A machine screw 60 is threaded through nut 58, thereby causing a threaded end of screw 60 to be biased against stop rod 50. When machine screw 60 is tightened to restrict slidable movement of stop rod 50 within second keyhole slot 52, stop rod 50 can be used for accurate positioning of a workpiece during woodworking or other operations when the workpiece is placed in abutting relationship with an end of stop rod 50.

Figure 9:
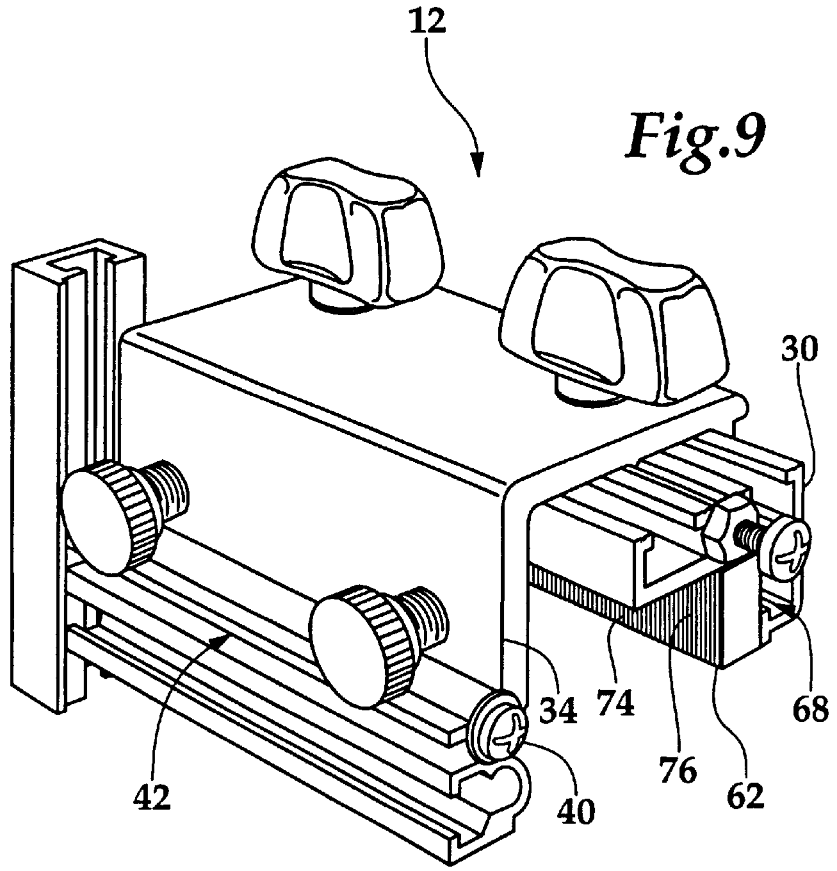
FIG. 9 depicts a perspective view of the mechanical stop of FIG. 1 having a vertical stop arm installed.
Figure 10:
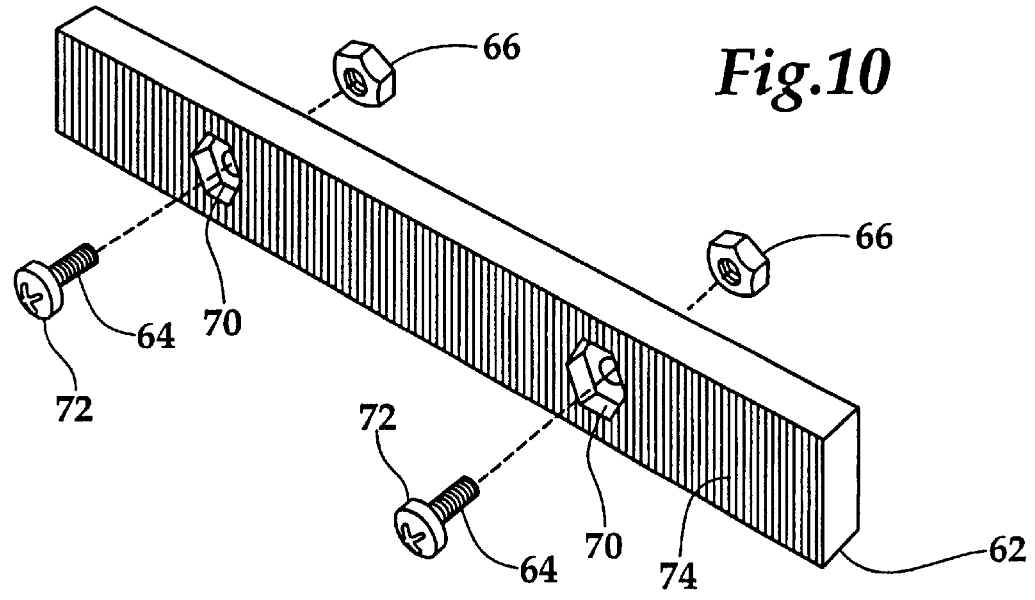
FIG. 10 illustrates a perspective view of a toothed rack according to the present invention.

Referring now to FIGS. 9 and 10 in the drawings, mechanical stop 12 is depicted without the presence of track 14. Mechanical stop 12 includes incremental adjustment means, which in the embodiment depicted in FIG. 9 comprises at least one toothed rack 62 removably attached to track engagement member 30. A machine screw 64 extends through rack 62 and threads into a nut 66 which is trapped within a slot 68 of track engagement member 30 such that tightening machine screw 64 securely attaches toothed rack 62 to track engagement member 30. As shown in FIG. 10, toothed rack 62 includes a recess 70 to permit a head 72 of machine screw 64 to be countersunk such that no part of head 72 extends beyond a toothed face 74 of toothed rack 62.

Toothed rack 62 includes a plurality of teeth 76 spaced apart at predetermined equal intervals along a longitudinal axis of toothed rack 62. As will be described in greater detail below, teeth 76 are provided to engage the teeth of a corresponding rack installed on a portion of track 14 such that mechanical stop 12 may be longitudinally positioned along track 14 at incremental intervals according to the spacing of teeth 76.

Figure 11:
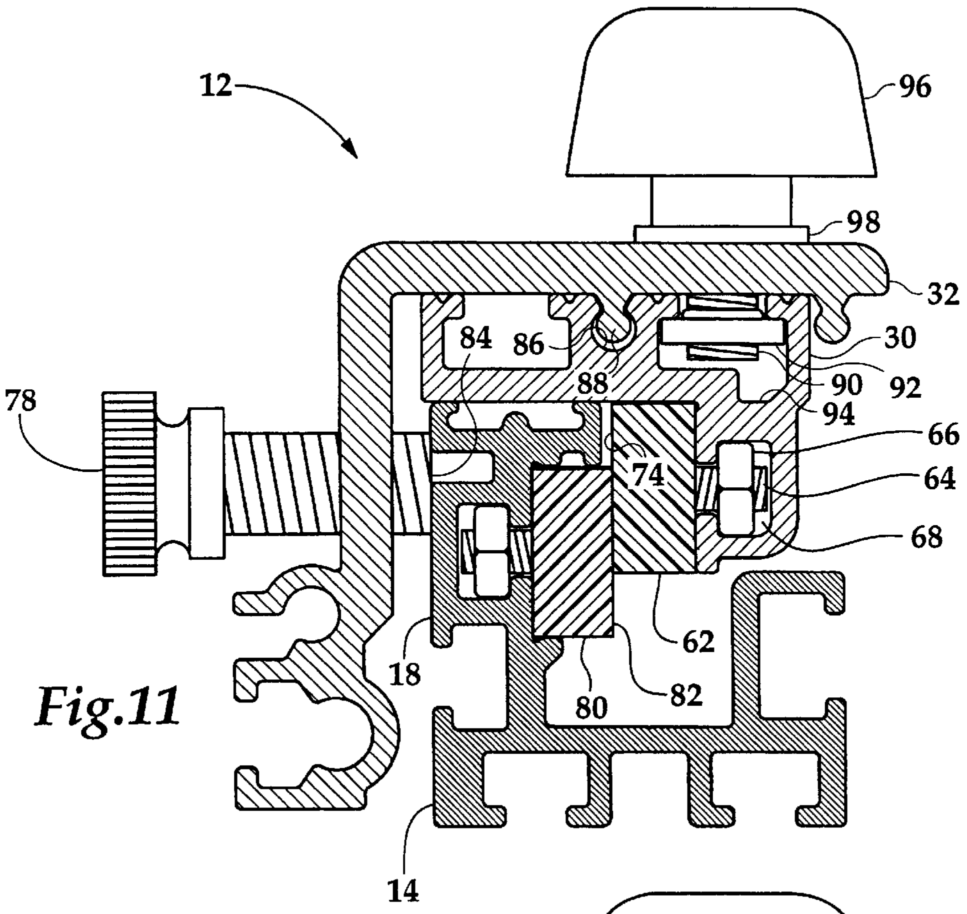
FIG. 11 depicts an end view of the mechanical stop and track of FIG. 1, the mechanical stop being configured in a non-expanded position.

Referring to FIG. 11 in the drawings, a fixed toothed rack 80 may be installed on track 14 for corresponding engagement with toothed rack 62 installed on track engagement member 30. Like toothed rack 62, toothed rack 80 includes a toothed face 82 having a plurality of teeth spaced apart at predetermined equal intervals along a longitudinal axis of toothed rack 80. The tooth spacing interval on toothed face 82 should correspond to the tooth spacing interval on toothed face 74 so that when toothed faces 74 and 82 are engaged, the teeth on toothed face 74 mesh together with the teeth on toothed face 82. When the corresponding teeth of toothed racks 62, 80 are meshed together, movement of track engagement member 30 along the longitudinal axis of track 14 is inhibited. For use in woodworking operations, the tooth spacing interval preferably should be 1/32 of an inch so that mechanical stop 12 may be positioned at any location along the length of track 14 at 1/32 of an inch intervals.

Referring still to FIG. 11 in the drawings, but also to FIG. 1, means for releasably attaching positioning body 32 to track 14 is provided by two thumb screws 78, which are threaded through positioning body 32. To prevent movement of track engagement member 30 and to inhibit movement of positioning body 32 along the longitudinal axis of track 14, thumb screws 78 are tightened, thereby biasing blunt ends 84 of thumb screws 78 against vertical face 18 of track 14. As thumb screws 78 are tightened, the teeth of toothed racks 62, 80 engage, preventing further movement of track engagement member 30. It will be readily understood by those skilled in the art that the relative movement of mechanical stop 12 and track 14 could be restricted using a single thumb screw 78, but the use of two (or more) thumb screws 78 substantially increases the rigidity of the structure.

A person having skill in the art will recognize that incremental adjustment means and means for releasably attaching positioning body 32 to track 14 could be provided in a configuration of mechanical stop 12 having a positioning body 32 and no track engagement member. In such a configuration, a toothed rack (or other incremental adjustment means) would be mounted directly to positioning body 32 for engagement with toothed rack 80 of track 14. Thumb screws 78, or other means for releasably attaching, would then be used to secure positioning body 32 to track 14 such that the teeth of the toothed racks are engaged. Other means for releasably attaching could include quick release clamps, cam devices, ratchet systems, or rack and pinion devices.

Figure 12:
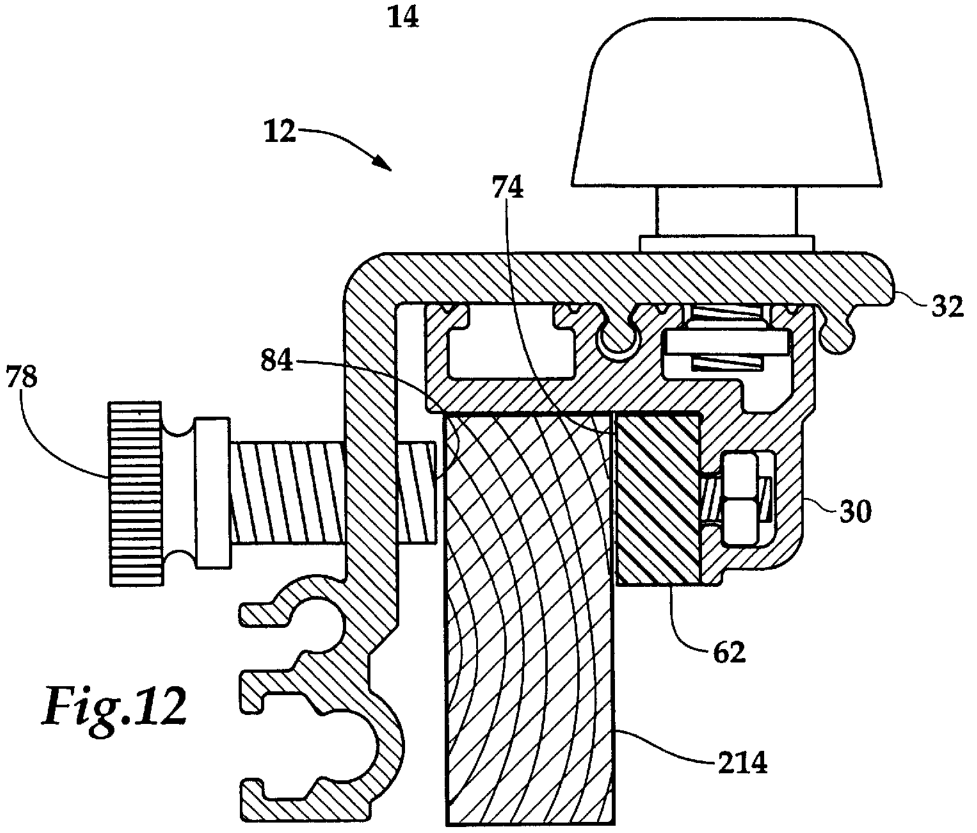
FIG. 12 illustrates an end view of the mechanical stop of FIG. 1 installed on a wooden fence according to the present invention.

While the use of racks 62 and 80 provides the desirable feature of precise incremental positioning according to the spacing of the teeth, those of ordinary skill in the art will appreciate that mechanical stop 12 may be attached to typical fences available in the art. Referring to FIG. 12 in the drawings, mechanical stop 12 is attached to a wooden fence 214. In this embodiment, when thumb screws 78 are tightened, wooden fence 214 is clamped between blunt screw ends 84 and face 74 of toothed rack 62, thereby preventing movement of mechanical stop 12 relative to wooden fence 214.

Racks 62 and 80 provide the preferred method of obtaining incremental positioning. However, those of ordinary skill in the art will readily appreciate that other incremental positioning means would provide the same desired function. For example, a series of equally spaced holes in a face of track 14 could be engaged by one or more shot pins attached to mechanical stop 12, thereby providing incremental positioning in an amount equal to the spacing of the holes. Also, a threaded lead screw rotatably attached to track 14 and engaging mechanical stop 12 would satisfy the incremental positioning function.

Figure 13:
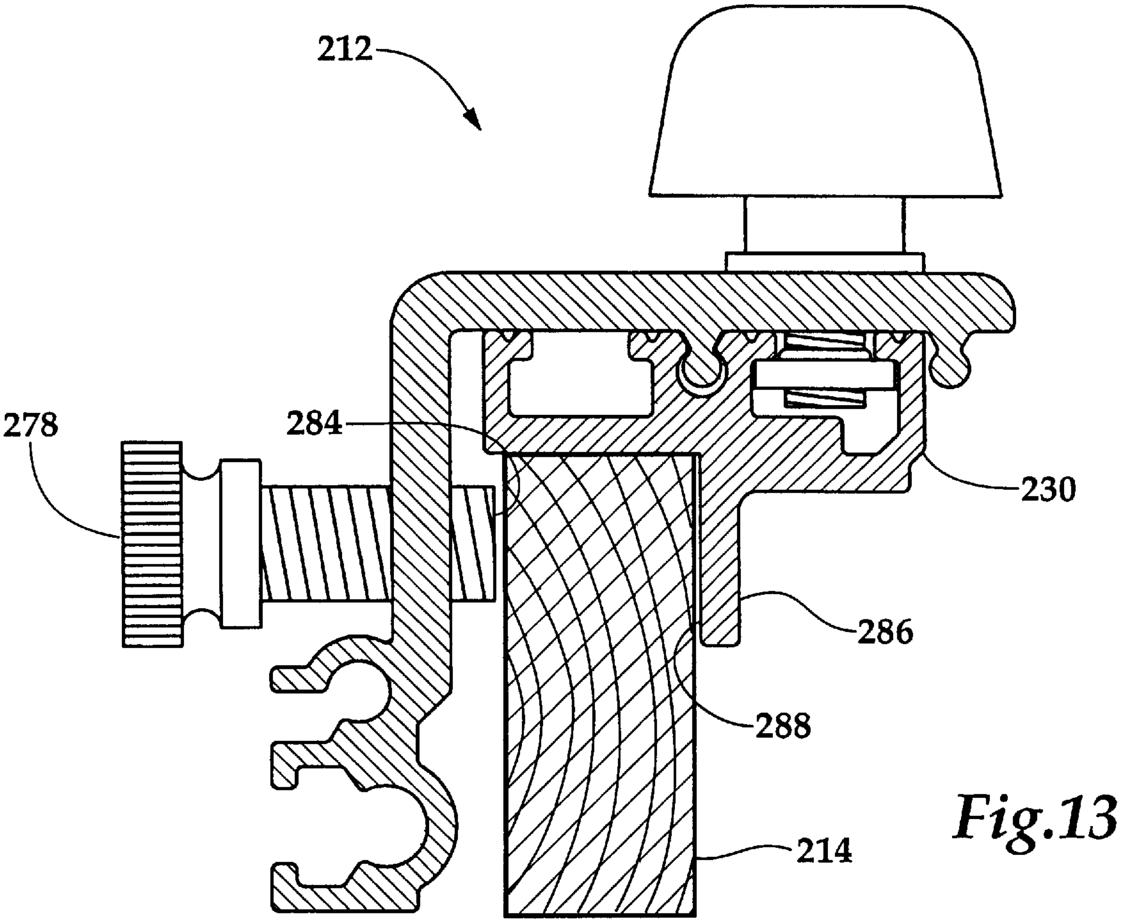
FIG. 13 depicts an end view of an alternative mechanical stop according to the present invention, the mechanical stop being installed on a wooden fence.

When mechanical stop 12 is attached to any fence that does not have a toothed rack 80, there is no need for mechanical stop 12 to itself include a corresponding toothed rack 62, as long as mechanical stop 12 is configured for attachment to the fence. Referring to FIG. 13 in the drawings, an embodiment of the present invention is illustrated in which no incremental positioning racks are used. Instead, a mechanical stop 212 includes a fence engagement member 230 having a flange 286 with a face 288 in abutting relationship with a rearward side of fence 214. By tightening thumb screws 278, fence 214 is clamped between blunt screw ends 284 and face 288, thereby preventing movement of mechanical stop 212 relative to fence 214.

Referring again to FIG. 11, but also to FIG. 14 in the drawings, an expandability feature of mechanical stop 12 is illustrated. In a non-expanded configuration of mechanical stop 12 shown in FIG. 11, mechanical stop 12 is configured for operation with track 14. In an expanded configuration shown in FIG. 14, mechanical stop is configured for operation with track 14 and an auxiliary fence 314 attached to track 14.

In the non-expanded configuration, track engagement member 30 preferably includes a keyhole slot 86 in an upper portion of track engagement member 30 for slidably engaging a first male retention element 88 appended to positioning body 32. By engaging first male retention element 88, keyhole slot 86 permits slidable movement of positioning body 32 relative to track engagement member 30 along a longitudinal axis of keyhole slot 86 but inhibits relative movement of positioning body 32 and track engagement member 30 in any other direction.

During woodworking or other operations, slidable movement of positioning body 32 relative to track engagement member 30 is restricted by machine screws 90 which are disposed vertically through flat washers 98 and positioning body 32 and are threaded into nuts 92 trapped within a T-slot 94. Tightening of machine screws 90 inhibits slidable movement of positioning body 32 relative to track engagement member 30. For ease of operation, release knobs 96 are attached to machine screws 90 for tightening and loosening the machine screws 90 manually and without the need for any additional tools.

The expanded configuration shown in FIG. 14 is provided for those operations that require use of auxiliary fence 314 in connection with a basic fence, such as track 14. The use of auxiliary fences is common in woodworking and other operations. Auxiliary fence 314, which would typically be made of wood, has a substantially vertical face 316 against which the workpiece can be positioned. Auxiliary fence 314 is preferably attached to track 14 with a plurality of machine screws 318 disposed through auxiliary fence 314 and threaded into corresponding nuts 320 trapped within T-slot 322. It will be readily appreciated that the heads of machine screws 318 must be countersunk or recessed within auxiliary fence 314 such that no portion of the heads extends beyond face 316.

To convert mechanical stop 12 from the non-expanded configuration of FIG. 11 to the expanded configuration of FIG. 14, thumb screws 78 are loosened to disengage mechanical stop 12 from track 14. With mechanical stop 12 disengaged from track 14, machine screws 90 are loosened by turning knobs 96. With screws 90 loosened, positioning body 32 is rendered slidably moveable along the longitudinal axis of track engagement member 30. Positioning body 32 and track engagement member 30 are completely detached by sliding positioning body 32 until first male retention element 88 is disengaged from keyhole slot 86.

To place mechanical stop 12 in the expanded configuration, a second male retention element 100 is slidably disposed within keyhole slot 86. In this expanded configuration, nuts 92 are trapped within a T-slot 102. Similar to the non-expanded configuration previously described, longitudinal movement of positioning body 32 along track engagement member 30 is inhibited by tightening machine screws 90 using corresponding knobs 96. Mechanical stop 12 is preferably engaged to track 14 by disposing the upper portions of auxiliary fence 314 and track 14 between toothed face 74 and blunt screw ends 84 of thumb screws 78. Thumb screws 78 are tightened, thereby biasing the respective blunt screw ends 84 against face 316 and clamping the upper portions of auxiliary fence 314 and track 14 between blunt screw ends 84 and toothed face 74.

Referring still to FIGS. 11 and 14, but also to FIG. 6 in the drawings, mechanical stop 12 permits micro-adjustment of positioning body 32 relative to track engagement member 30 along the longitudinal axis of keyhole slot 86. A micropositioning screw 104 is threaded through a retention nut 106 and is further threaded directly into keyhole slot 86 having threads 108 disposed in the wall thereof. In woodworking or other operations, positioning body 32 is micro-adjusted relative to track engagement member 30 by loosening thumb screws 78 and knobs 96 to render positioning body 32 slidably movable relative to track engagement member 30. Then, micropositioning screw 104 is turned until a screw end 110 has been selectively positioned at a desired position, at which time, positioning body 32 is slid along the longitudinal axis of keyhole slot 86 until an end of first male retention element 88 (or second male retention element 100 if in the expanded configuration) is placed in abutting relationship with screw end 110.

Because power tools often generate substantial vibrations, retention nut 106 is preferably made of nylon or like material to prevent micropositioning screw 104 from vibrating loose during woodworking or other operations. Further, micropositioning screw 104 preferably has a thread pitch of 32 threads per inch such that one complete turn of micropositioning screw 104 will produce a micropositioning interval of 1/32 of an inch.

Figure 15:
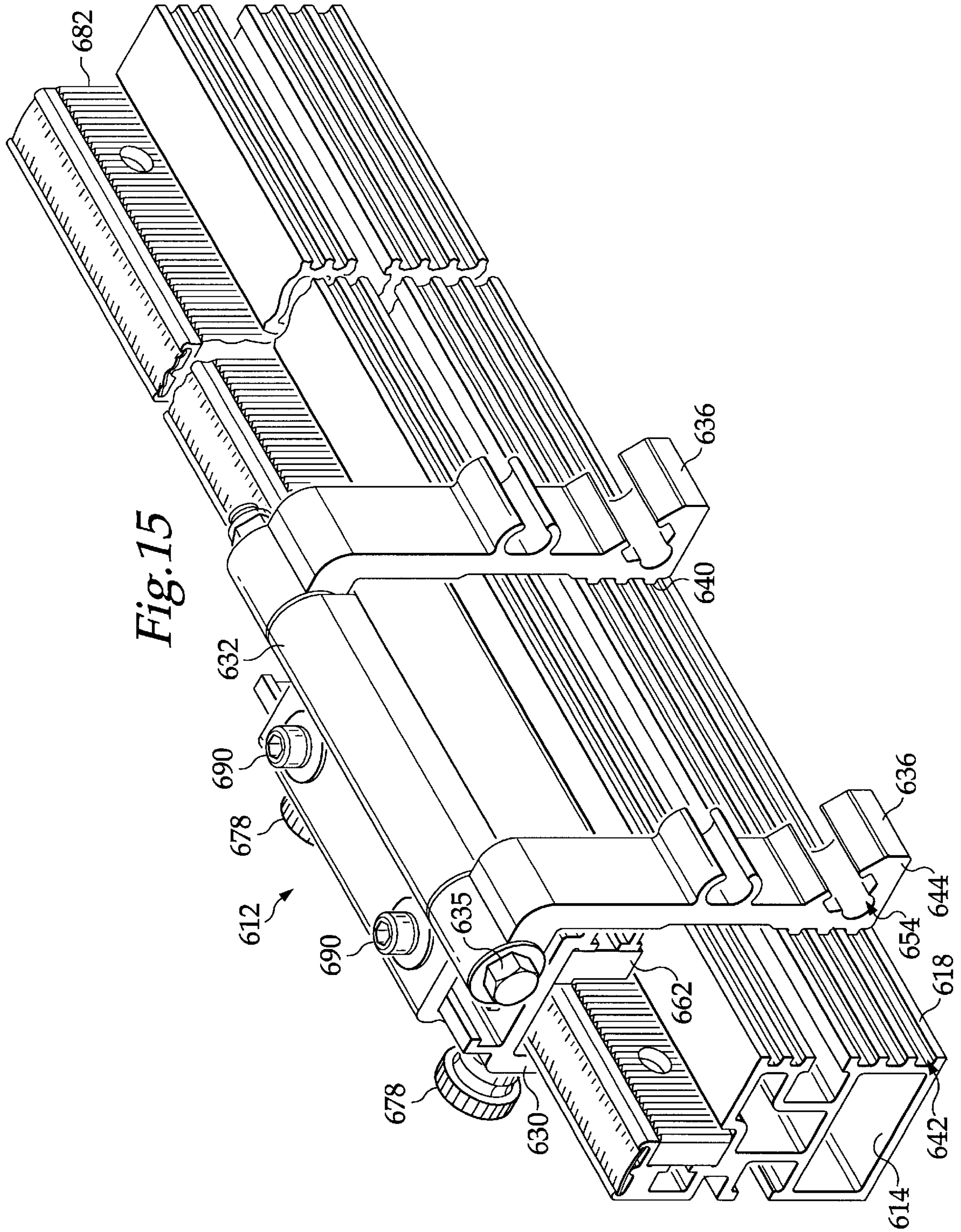
FIG. 15 depicts a perspective view of an alternative embodiment of a track and a mechanical stop according to the present invention, the mechanical stop having a positioning body with two stop arms pivotally mounted to the positioning body, the stop arms having anti-biasing means according to the present invention.
Figure 16:
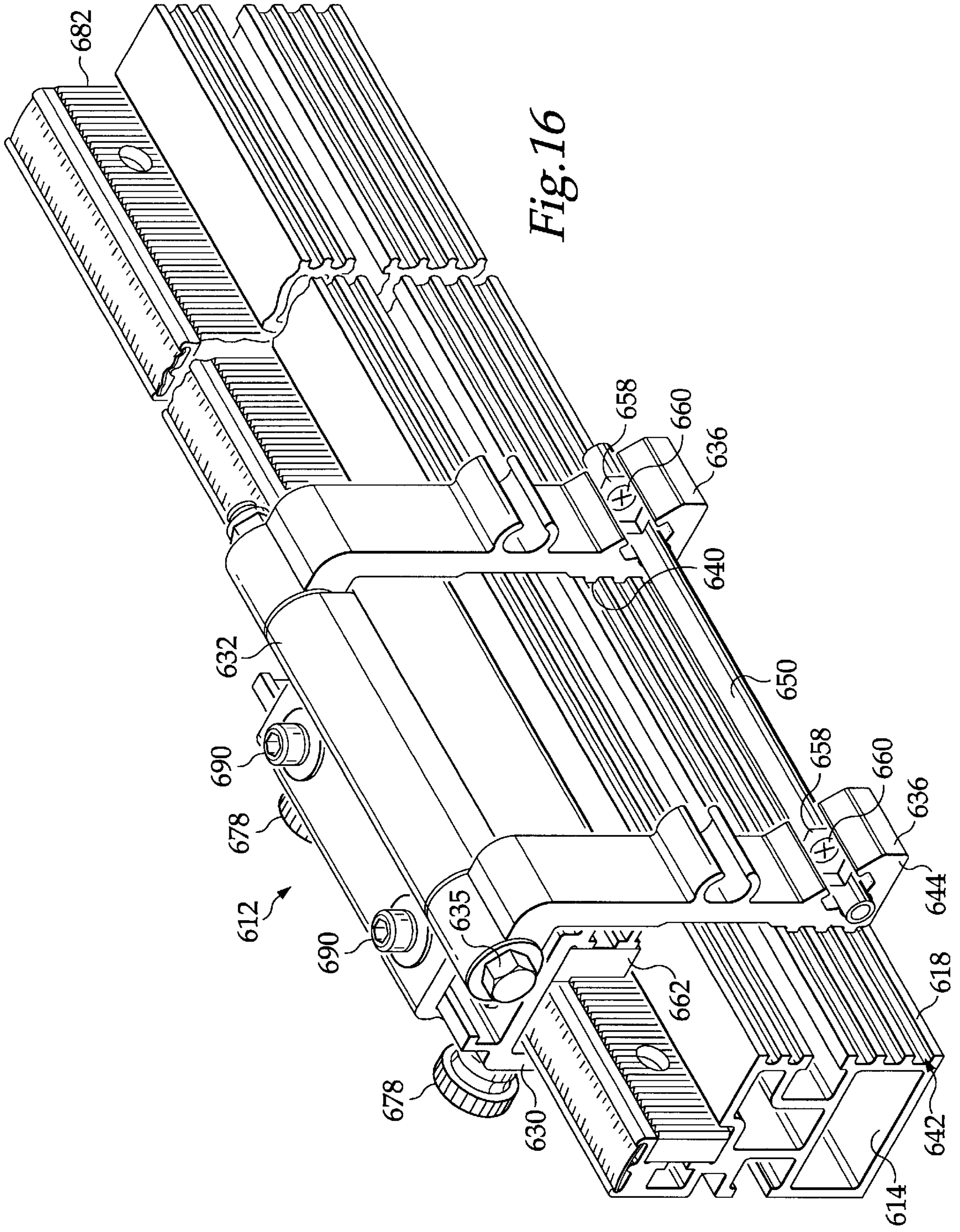
FIG. 16 illustrates a perspective view of the track, positioning body, and stop arms of FIG. 15, the stop arms being connected by a connecting rod.
Figure 17:
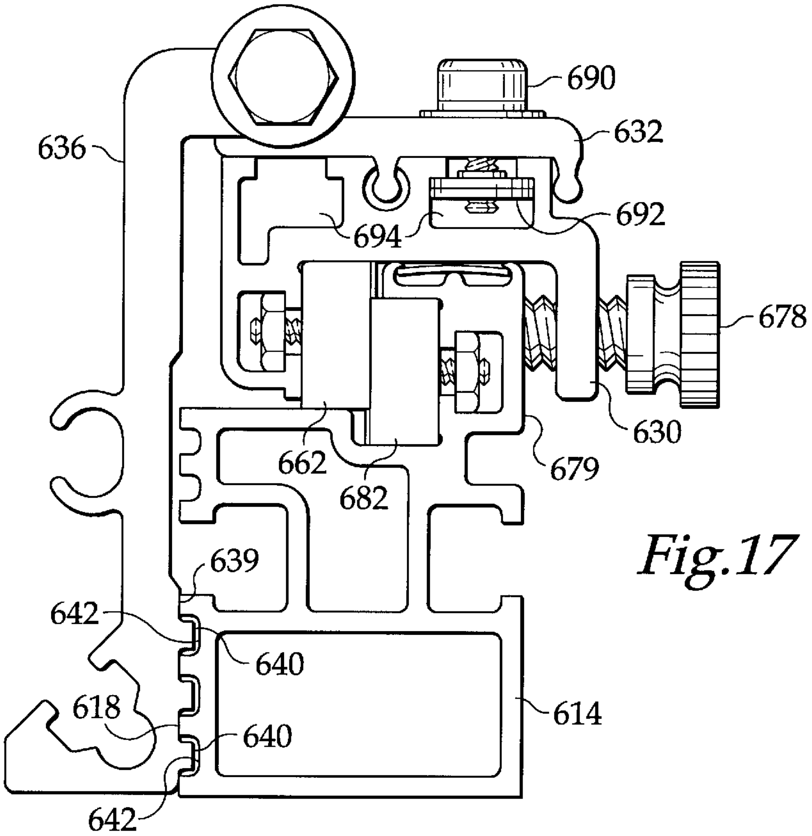
FIG. 17 depicts an end view of the track and mechanical stop of FIG. 15, the mechanical stop having anti-biasing means according to one embodiment of the present invention.

Referring to FIGS. 15, 16 and 17 in the drawings, a mechanical stop 612 according to another embodiment of the present invention is installed on a track 614. Mechanical stop 612 includes a track engagement member 630, a positioning body 632, and at least one stop arm 636 pivotally connected to positioning body 632 at a pivot portion 635 of positioning body 632. Preferably, pivot portion 635 is a bolt that passes through holes in stop arms 636 and a sleeve on positioning body 632, but it will be readily understood that pivot portion 635 could be any type of bolt, screw, rod, pin, or other element that is capable of pivotally connecting stop arm 636 to positioning body 632.

Mechanical stop 612 is connected to track 614 similar to that previously described for mechanical stop 12 of FIG. 1. Incremental adjustment means are provided for adjusting mechanical stop 612 along a longitudinal axis of track 614. Preferably, the incremental adjustment means includes a toothed rack 662 rigidly connected to track engagement member 630, the toothed rack 662 configured to matingly engage a second toothed rack 682 rigidly attached to track 614. The mating engagement of teeth on the toothed racks 662, 682 prevents longitudinal movement of track engagement member 630 along track 614. Thumb screws 678, which are threaded through a rear portion of track engagement member 630, engage a rear surface 679 of track 614. By tightening thumb screws 678, toothed racks 662, 682 engage, thereby securely attaching track engagement member 630 to track 614.

Alternatively, toothed rack 662 could be connected directly to positioning body 632. In this configuration, positioning body 632 would be incrementally positioned along track 614 directly, eliminating the need for a track engagement member 630.

Positioning body 632 includes means for releasably attaching positioning body 632 to track 614. Preferably, the means for releasably attaching include screws 690 that pass through positioning body 632. Each screw 690 engages a nut 692 that is disposed in one of two T-slots 694 located in an upper portion of track engagement member 630. T-slots 694 provide the expandability feature previously discussed with reference to mechanical stop 12 in FIGS. 11 and 14. It should be obvious to one having skill in the art that by attaching positioning body 632 to track engagement member 630, positioning body 632 is effectively attached to track 614 when toothed rack 662 on track engagement member 632 is matingly engaged to toothed rack 682. It should also be obvious that the means for releasably attaching positioning body 632 could also be used to attach positioning body 632 directly to a T-slot disposed in a portion of track 614, thereby eliminating a need for track engagement member 630. Finally, track engagement member 630 could be combined with positioning body 632 to create a single-piece positioning body 632. In such a configuration, thumb screws 678 may be used as the means for releasably attaching positioning body 632 to track 614.

In the embodiment shown in FIGS. 15 and 16, two stop arms 636 are attached to positioning body 632, although only one is necessary. Each stop arm 636 is configured to rotate between a work position (shown in FIGS. 15 and 16), in which the stop arm 636 can engage a workpiece, and a standby position, in which the stop arm 636 is unable to engage the workpiece. When configured with two stop arms 636, either stop arm 636 may be used independently for positioning the workpiece or the stop arms 636 may be connected together with a connecting rod 650 placed through slots 654 in each stop arm 636, as shown in FIG. 16. Preferably, connecting rod 650 is attached to each stop arm 636 using a screw 660, each screw 660 being threaded through a nut 658 retained within slot 654. The installation of connecting rod 650 is similar to the previously described installation of stop rod 50 in FIG. 8. Connecting rod 650 allows both stop arms 636 to rotate together and adds substantial rigidity to mechanical stop 612. The increased rigidity substantially reduces the inaccuracy associated with positioning a workpiece using a pivotal stop arm.

Referring more specifically to FIG. 17, each stop arm 636 includes a rear face 639 that is configured to be substantially adjacent to a substantially vertical face 618 of track 614. In the preferred embodiment depicted, rear face 639 is parallel to and mates with vertical face 618, although rear face 639 could be spaced apart from and angled in relation to vertical face 618.

In some mechanical stops currently available, pivotal stop arms are susceptible to being dislodged from the work position by a workpiece that slides between the rear face of the stop arm and the vertical face of the track. This is an especially common occurrence when using the mechanical stop with mitered workpieces having sharp comers. Mechanical stop 612 includes anti-biasing means configured to prevent a workpiece from dislodging stop arms 636 during woodworking or other operations. In the embodiment shown in FIGS. 15, 16, and 17, rear face 639 of stop arm 636 includes at least one tab 640 extending from rear face 639. Each tab 640 extends along rear face 639 substantially parallel to the longitudinal axis of track 614. Each tab is configured to be received by a groove 642 located in vertical face 618 of track 614 such that the tab extends into the groove, past the vertical face 618, when stop arm 636 is in the work position. It should be obvious to one skilled in the art that the shape, number, and size of the tabs 640 and grooves 642 could vary without compromising the anti-biasing means of mechanical stop 612. Furthermore, the angular orientation of tabs 640 and grooves 642 relative to the longitudinal axis of track 614 could vary.

In operation, a workpiece (not shown) is placed against track 614 such that one edge of the workpiece abuts vertical face 618. If the workpiece is mitered such that another edge of the workpiece does not matingly abut a work face 644 on stop arm 636, then the mitered corner of the workpiece will engage the stop arm 636 along an intersection of vertical face 618 and work face 644. As the woodworking or other operations are performed on the workpiece, forces on the workpiece tend to push the workpiece toward stop arm 636. Since tabs 640 extend into grooves 642, the comer of the workpiece actually abuts the tabs 640 and is unable to slide between rear face 639 and vertical face 618, thereby preventing stop arm 636 from being dislodged from the work position.

Figure 18:
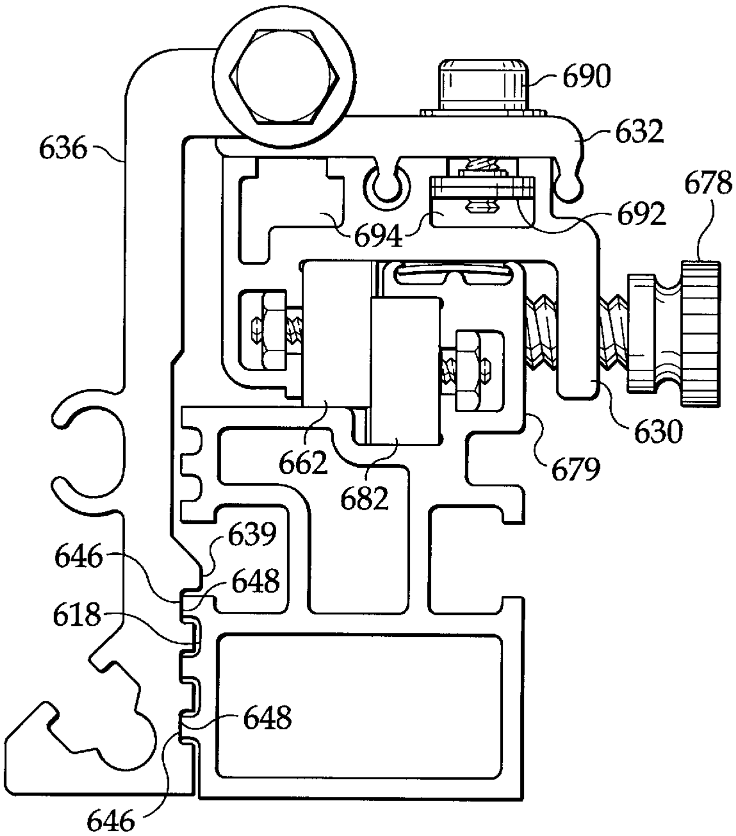
FIG. 18 illustrates an end view of a track and a mechanical stop similar to the those shown in FIG. 17, the mechanical stop having anti-biasing means according to an alternative embodiment of the present invention.

Referring to FIG. 18 in the drawings, another embodiment featuring anti-biasing means is illustrated. In the depicted embodiment, stop arms 636 again include rear face 639, and track 614 again includes vertical face 618. However, the anti-biasing means comprises a plurality of grooves 646 disposed in rear face 639. Each groove 646 extends along rear face 639 substantially parallel to the longitudinal axis of track 614. Each groove 646 is configured to receive a tab 648 extending from vertical face 618 of track 614 such that the tab 648 extends into the groove 646, past the rear face 639, when stop arm 636 is in the work position. It should be obvious to one skilled in the art that the shape, number, and size of the grooves 646 and tabs 648 could vary without compromising the anti-biasing means of mechanical stop 612. Furthermore the angular orientation of grooves 646 and tabs 648 relative to the longitudinal axis of track 614 could vary.

The operation of mechanical stop 612 having the anti-biasing means shown in FIG. 18 is similar to that described for the anti-biasing means displayed in FIG. 17. The mitered corner of the workpiece contacts tabs 648 which are allowed to extend into grooves 646. The presence of grooves 646 allows tabs 648 to extend past rear face 639, thereby preventing the workpiece from sliding between stop arm 636 and track 614 when stop arm 636 is in the work position.

Figure 19:
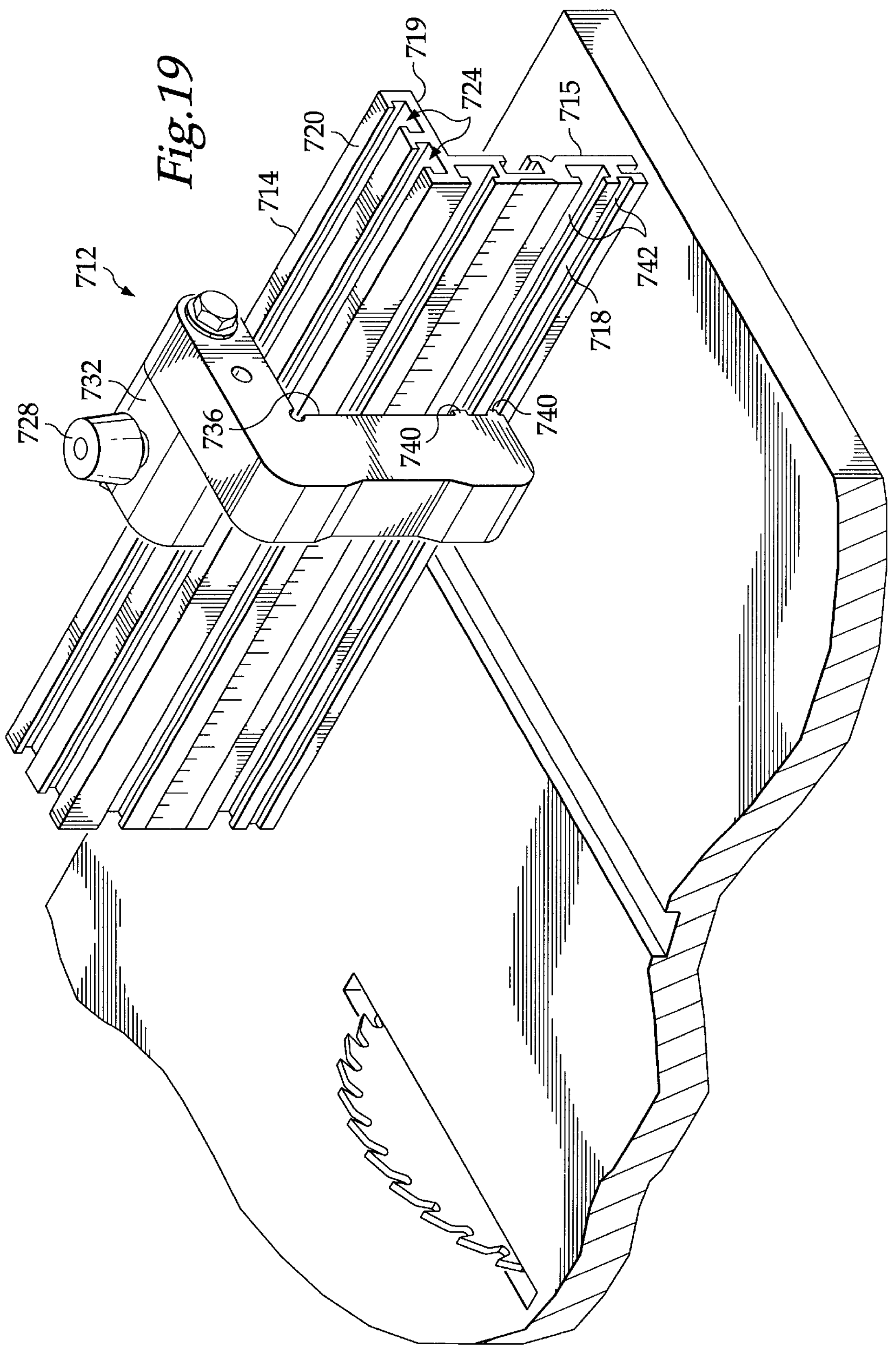
FIG. 19 depicts a perspective view of a track and a mechanical stop according to the present invention, the mechanical stop having a pivotable flip stop and anti-biasing means.
Figure 20:
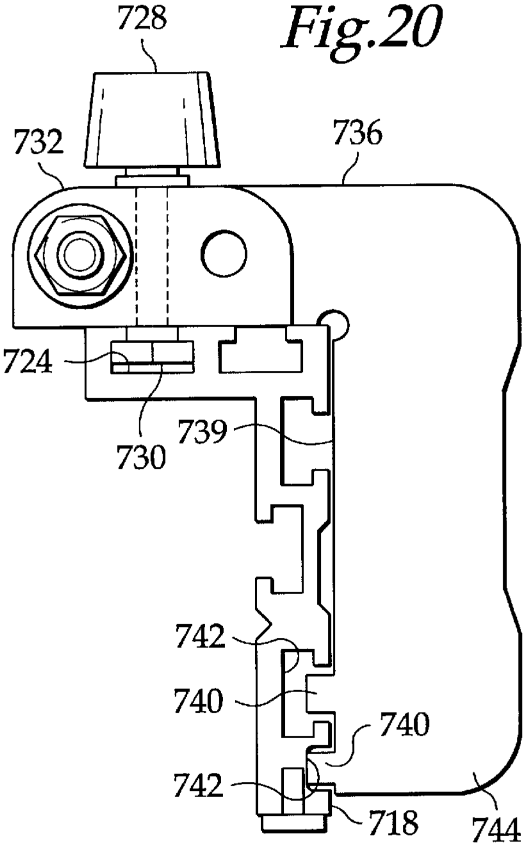
FIG. 20 illustrates an end view of the track and mechanical stop of FIG. 19.
Figure 21:
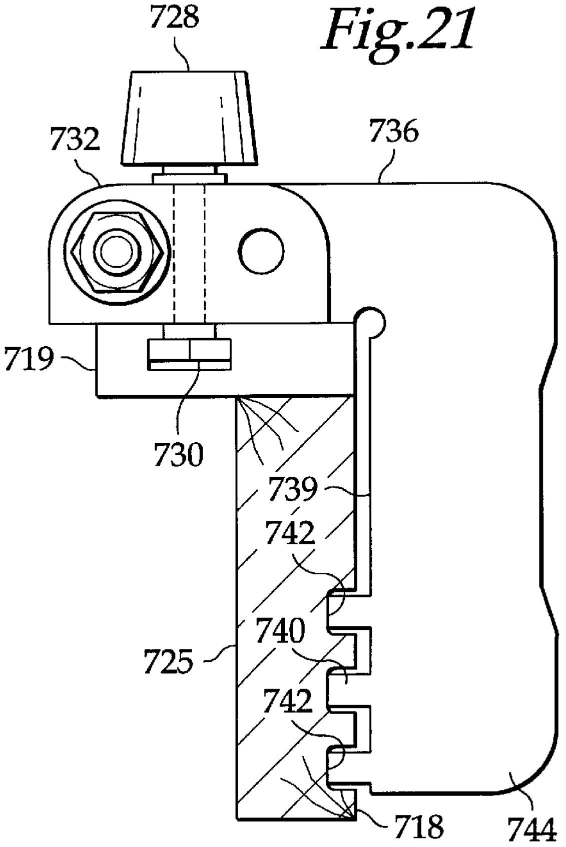
FIG. 21 depicts an end view of the mechanical stop of FIG. 18 installed on a track and wooden fence according to the present invention.

Referring now to FIGS. 19, 20, and 21 in the drawings, a woodworking machinery jig and fixture system 712 includes a section of track 714, a base or positioning body 732, and a flip stop 736. Track 714 has a generally L-shaped cross section, the track 714 having a first leg 715 with a front side 718 and a rear side and a second leg 719 with a top side 720 and a bottom side. At least one longitudinal guide 724 is disposed in top side 720 of second leg 719 for releasably mounting accessories to track 714. As an alternative to first leg 715, FIG. 21 shows track 714 having a second leg 719 only, the second leg being attached along one edge of a wooden fence 725. Wooden fence 725 is analogous to first leg 715 in that wooden fence 725 includes front side 718 and a rear side.

A screw 728 and a nut 730 are used to releasably attached base 732 to track 714, the nut 730 being disposed within one of the guides 724, which are preferably T-slots. By tightening screw 728, base 732 is securely attached to track 714 such that movement along the longitudinal axis of guide 724 is inhibited. If screw 728 is loosened, base 732 is capable of sliding along guide 724 so that base 732 can be properly positioned relative to track 714.

Flip stop 736 is pivotally mounted to base 732 such that it can pivot about a longitudinal axis of track 714. Flip stop 736 is configured to pivot between a work position, in which flip stop 736 can engage a workpiece, and a standby position, in which slip stop 736 is out of position to engage the workpiece. Flip stop 736 includes a rear surface 739 that is substantially adjacent to front side 718 of first leg 715 when flip stop 736 is in the work position. In the preferred embodiment depicted, rear surface 739 is parallel to and mates with front side 718, although rear surface 739 could be spaced apart from (see FIG. 21) and angled in relation to front side 718.

Jig and fixture system 712 includes anti-biasing means configured to prevent a workpiece from dislodging flip stop 736 during woodworking or other operations. In the embodiment shown in FIGS. 19, 20, and 21, rear surface 739 of flip stop 736 includes at least one tab 740 extending from rear surface 739. Each tab 740 extends along rear surface 739 substantially parallel to the longitudinal axis of track 714. Each tab 740 is received by a groove 742 located in front side 718 of track 714 such that the tab 740 extends into the groove 742, past the front side 718, when flip stop 736 is in the work position. It should be obvious to one skilled in the art that the shape, number, and size of tabs 740 and grooves 742 could vary without compromising the anti-biasing means of jig and fixture system 712. Furthermore, the angular orientation of tabs 740 and grooves 742 relative to the longitudinal axis of track 714 could vary.

In operation, a workpiece 750 is placed against track 714 such that one edge of the workpiece abuts front side 718. If the workpiece is mitered such that another edge of the workpiece does not matingly abut a work face 744 on flip stop 736, then the mitered corner of the workpiece will engage the flip stop 736 along an intersection of work face 744 and front side 718. As the woodworking or other operations are performed on the workpiece, forces on the workpiece tend to push the workpiece toward flip stop 736. Since tabs 740 extend into grooves 742, the corner of the workpiece actually abuts tabs 740 and is unable to slide between rear surface 739 and front side 718, thereby preventing flip stop 736 from being dislodged from the work position.

Another embodiment using anti-biasing means could include a rear surface 739 having at least one groove disposed in the rear surface 739. In such an embodiment, a tab located on front side 718 would be received by the groove when flip stop 736 is in the work position. The tab would prevent dislodgement of flip stop 736 by a workpiece in a way similar to that described in connection with mechanical stop 612 of FIG. 18.

Even though many of the examples discussed herein are applications of the present invention in the field of woodworking, the present invention also can be used in association with any machining or construction process where it is necessary to hold or accurately and precisely position a workpiece. A primary advantage of the present invention is that the invention provides a mechanical stop having a rotatable stop arm and anti-biasing means for preventing the stop arm from being dislodged by the workpiece. Another advantage of the present invention is that the rotatable stop arm and anti-biasing means work in conjunction with a positioning body that is adjustably mounted on a track. The positioning body is adjustable longitudinally along the track, and also is configured for positioning between a non-expanded and an expanded position, the expanded position allowing use of the mechanical stop with an auxiliary fence.

It should be apparent from the foregoing that an invention having significant advantages has been provided. While the invention is shown in only one of its forms, it is not just limited but is susceptible to various changes and modifications without departing from the spirit thereof.

I claim:

1. An apparatus configured for attachment to a track having a substantially vertical face for positioning a workpiece in relation to a cutting tool, the apparatus comprising:

a positioning body having means for releasably attaching the positioning body to the track;

a stop arm pivotally connected to the positioning body such that the stop arm can be rotated between a work position and a standby position, the stop arm including a rear face that is configured to be substantially adjacent to the vertical face of the track when the stop arm is in the work position; and anti-biasing means configured to prevent the workpiece from dislodging the stop arm from the work position such that the workpiece could slide between the rear face of the stop arm and the vertical face of the track.

2. The apparatus according to claim 1, wherein the anti-biasing means further comprises at least one tab extending from the rear face of the stop arm, the tab being configured to be received by a channel disposed in the vertical face of the track.

3. The apparatus according to claim 1, wherein the anti-biasing means further comprises at least one channel disposed in the rear face of the stop arm, the channel being configured to receive a tab extending from the vertical face of the track.

4. The apparatus according to claim 1, wherein the rear surface of the flip stop mates with the vertical face of the track.

5. The apparatus according to claim 1, wherein the means for releasably attaching the positioning body further comprises a screw received by a bolt that is slidably disposed within a guide located on the track.

6. The apparatus according to claim 5, wherein the guide is a T-slot.

7. The apparatus according to claim 1 further comprising:

a first toothed rack rigidly attached to the positioning body, the first toothed rack being configured to matingly engage a second toothed rack rigidly attached to the track; and wherein the means for releasably attaching the positioning body further comprises a thumb screw threadingly attached to the positioning body and configured to hold the first toothed rack in engagement with the second toothed rack when the thumb screw is sufficiently tightened.

8. The apparatus according to claim 1 further comprising:

a track engagement member; wherein the positioning body is slidingly attached to the track engagement member;

a first toothed rack rigidly attached to the track engagement member, the first toothed rack being configured to matingly engage a second toothed rack rigidly attached to the track; and wherein the means for releasably attaching the positioning body further comprises a thumb screw threadingly attached to the positioning body and configured to hold the first toothed rack in engagement with the second toothed rack when the thumb screw is sufficiently tightened.

9. The apparatus according to claim 1 further comprising incremental adjustment means configured for adjusting the positioning body along a longitudinal axis of the track.

10. A woodworking machinery jig and fixture system comprising:

a section of track having a generally L-shaped cross section, the track having a first leg with a front side and a rear side and having a second leg connected to one end of said first leg at a right angle, said second leg extending rearwardly from said first leg and having a top side and a bottom side, wherein said track includes a longitudinal guide for releasably mounting accessories to said track;

a base adjustably mounted to said track so that said base is slideable longitudinally relative to said guide and securable at multiple alternative positions along said track;

a flip stop pivotally mounted to said base such that the flip stop is pivotable about a longitudinal axis of the track between a work position in which said flip stop is in a position to engage a workpiece and a standby position in which said flip stop is out of position to engage the workpiece, said flip stop having a rear surface that is substantially adjacent to the front side of the first leg when the flip stop is in the work position; and anti-biasing means configured to prevent a workpiece from dislodging the flip stop from the work position such that the workpiece could slide between the rear surface of the flip stop and the front side of the first leg.

11. The system according to claim 10, wherein the anti-biasing means further comprises at least one tab extending from the rear surface of the flip stop, the tab being received by a channel disposed in the front side of the first leg when the flip stop is in the work position.

12. The system according to claim 10, wherein the anti-biasing means further comprises at least one channel disposed in the rear surface of the flip stop, the channel receiving a tab extending from the front side of the first leg when the flip stop is in the work position.

13. The system according to claim 10, wherein the first leg of the track is a woodworking support which is separate from the second leg, and wherein the system further comprises means for fixedly mounting the second leg of the track to the woodworking support.

14. The system according to claim 10, wherein the rear surface of the flip stop mates with the front side of the first leg when the flip stop is in the work position.

15. An apparatus configured for attachment to a track having a substantially vertical face for positioning a workpiece in relation to a cutting tool, the apparatus comprising:

a positioning body having means for releasably attaching the positioning body to the track;

incremental adjustment means configured for adjusting the positioning body along a longitudinal axis of the track;

a stop arm connected to the positioning body, the stop arm including a rear face configured such that it is substantially adjacent to the vertical face of the track when the positioning body is attached to the track; and anti-biasing means configured to prevent the workpiece from dislodging the stop arm such that the workpiece could slide between the rear face of the stop arm and the vertical face of the track.

16. The apparatus of claim 15, wherein the anti-biasing means further comprises at least one tab extending from the rear face of the stop arm, the tab being configured to be received by a channel disposed in the vertical face of the track.

17. The apparatus of claim 15, wherein the anti-biasing means further comprises at least one channel disposed in the rear face of the stop arm, the channel being configured to receive a tab extending from the vertical face of the track.

18. The apparatus of claim 15, wherein the incremental adjustment means further comprises a first toothed rack rigidly attached to the positioning body, the first toothed rack being configured to matingly engage a second toothed rack rigidly attached to the track.

19. The apparatus of claim 15 further comprising:

a track engagement member, wherein the positioning body is slidingly received by the track engagement member;

wherein the incremental adjustment means further comprises a first toothed rack rigidly attached to the track engagement member, the first toothed rack being configured to matingly engage a second toothed rack rigidly attached to the track; and wherein the means for releasably attaching the positioning body ensures that the first toothed rack remains in engagement with the second toothed rack when the positioning body is attached to the track.

20. The apparatus of claim 15, wherein the rear face of the stop arm mates with the vertical face of the track.

21. The apparatus of claim 15, wherein the stop arm is pivotally mounted to the positioning body such that the stop arm is capable of pivoting between a work position in which the stop arm is in a position to engage the workpiece and a standby position in which the stop arm is out of position to engage the workpiece.

22. The apparatus of claim 15 further comprising:

a track engagement member; wherein the positioning body is slidingly received by the track engagement member;

wherein the stop arm is pivotally mounted to the positioning body such that the stop arm is capable of pivoting between a work position and a standby position;

wherein the incremental adjustment means further comprises a first toothed rack rigidly attached to the track engagement member, the first toothed rack being configured to matingly engage a second toothed rack rigidly attached to the track; and wherein the means for releasably attaching the positioning body further comprises a thumb screw threadingly attached to the positioning body and configured to hold the first toothed rack in engagement with the second toothed rack when the thumb screw is sufficiently tightened.

23. The apparatus according to claim 22, wherein the first toothed rack on the track engagement member allows the track engagement member to be incrementally positioned along the track.

24. The apparatus according to claim 23, wherein the positioning body is capable of being independently positioned along the track engagement member.

* * * * *